UNITED STATES PATENT OFFICE.

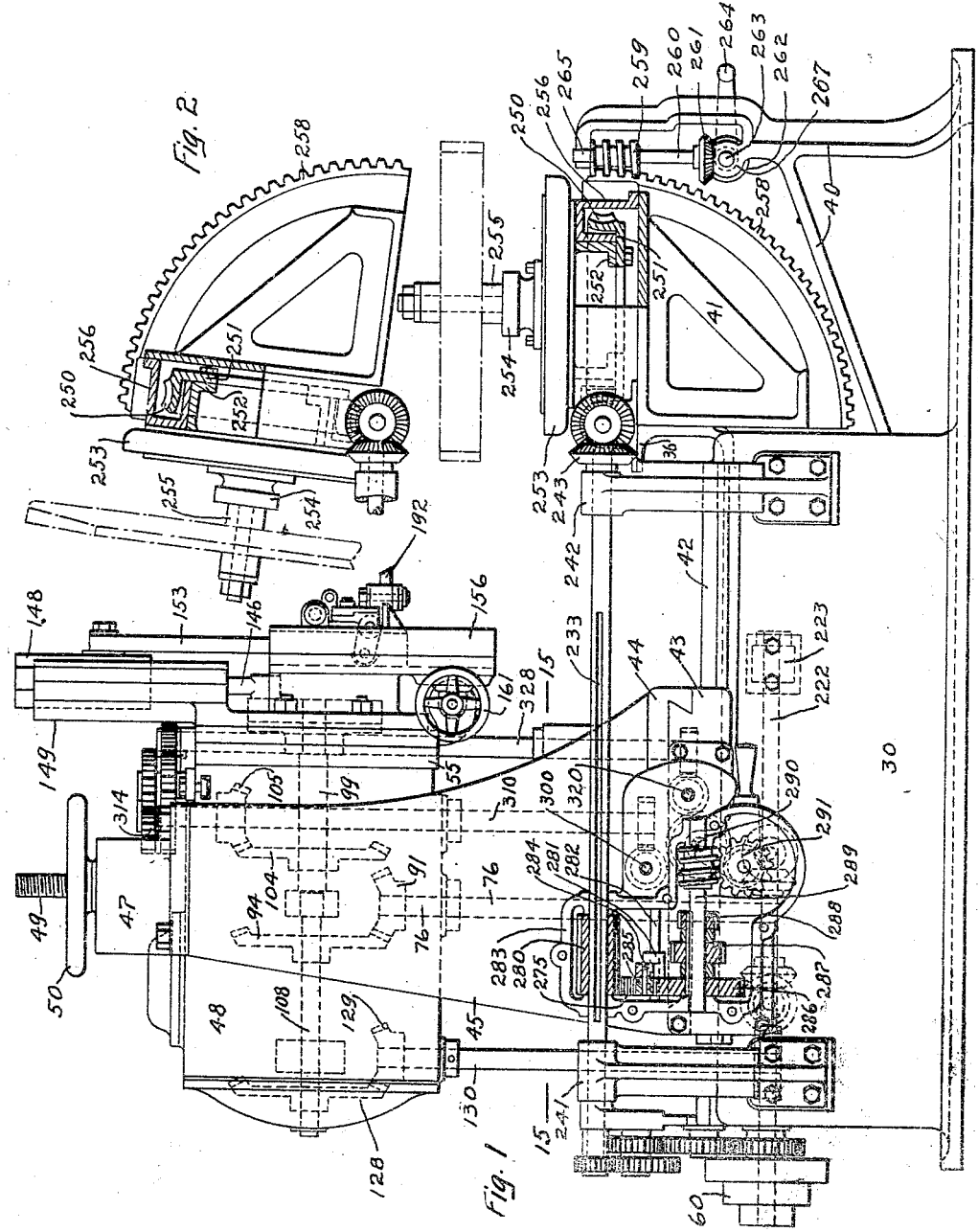

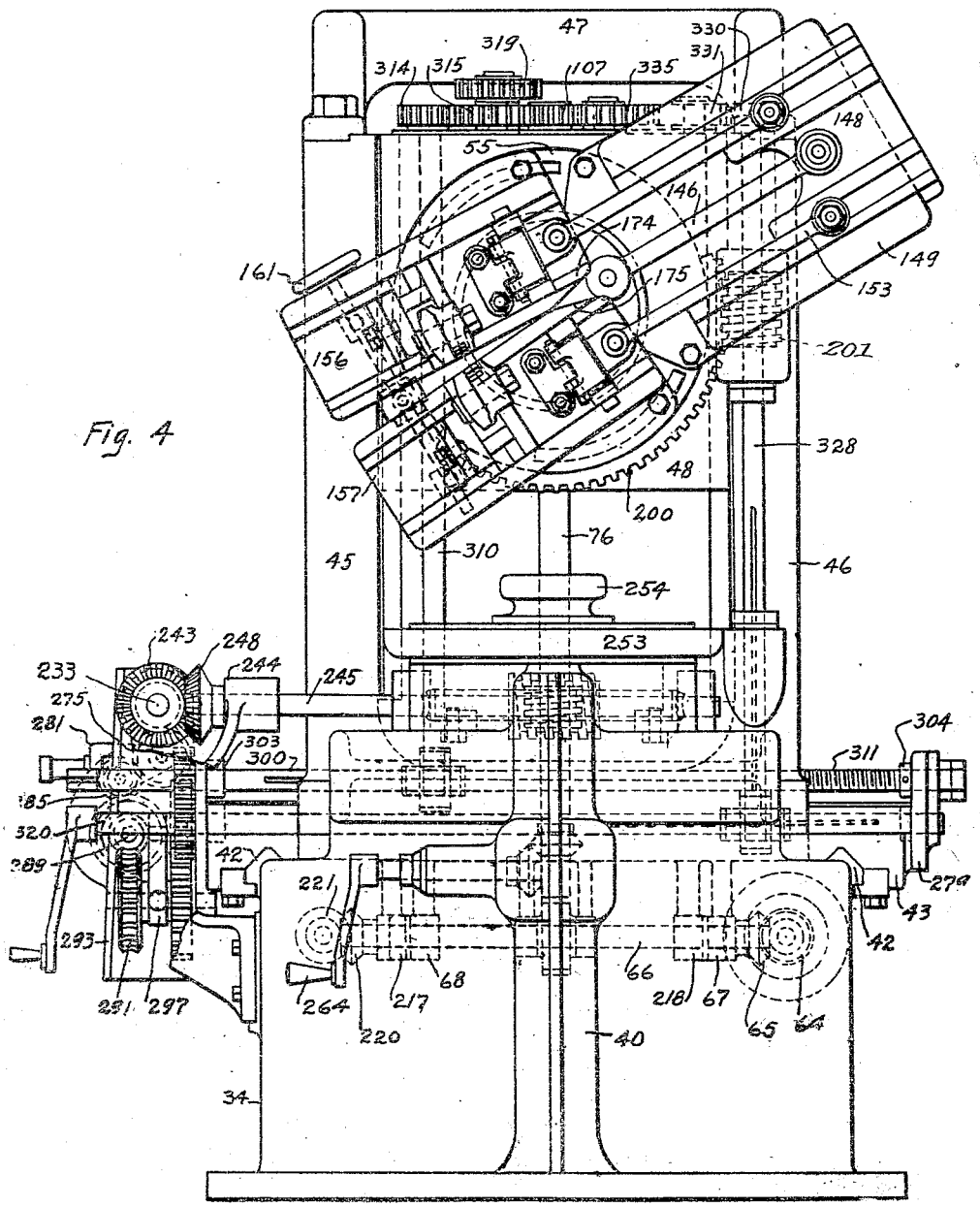

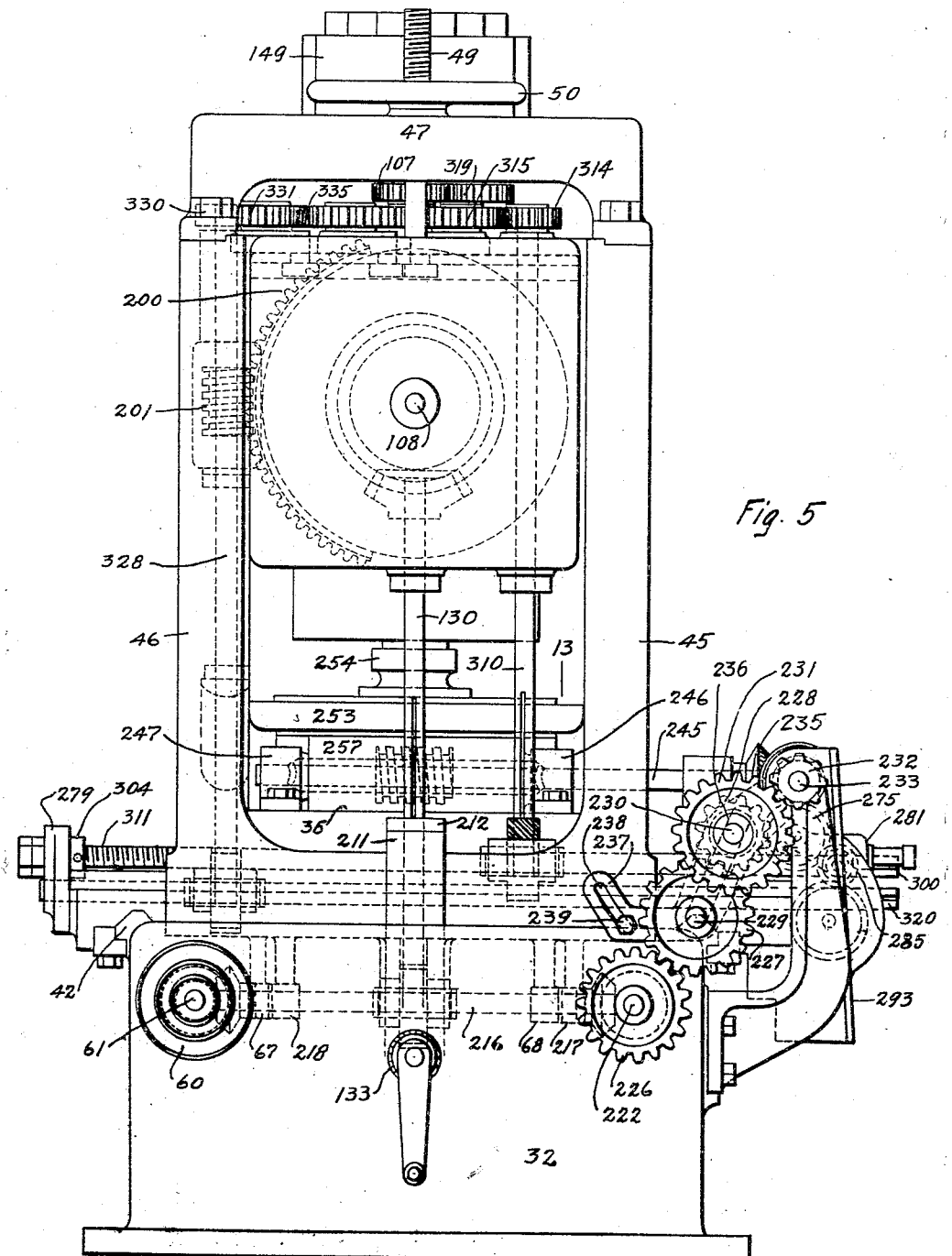

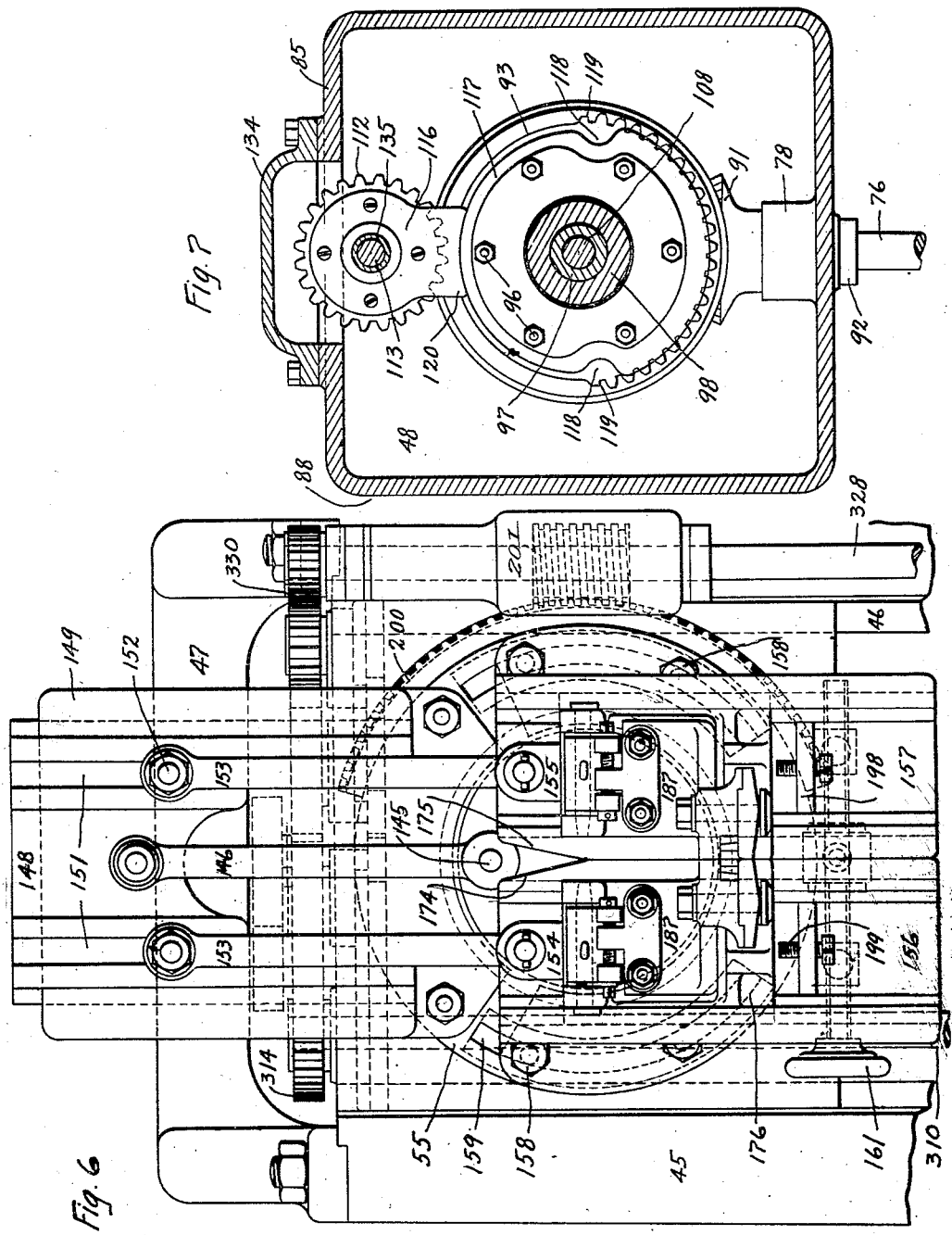

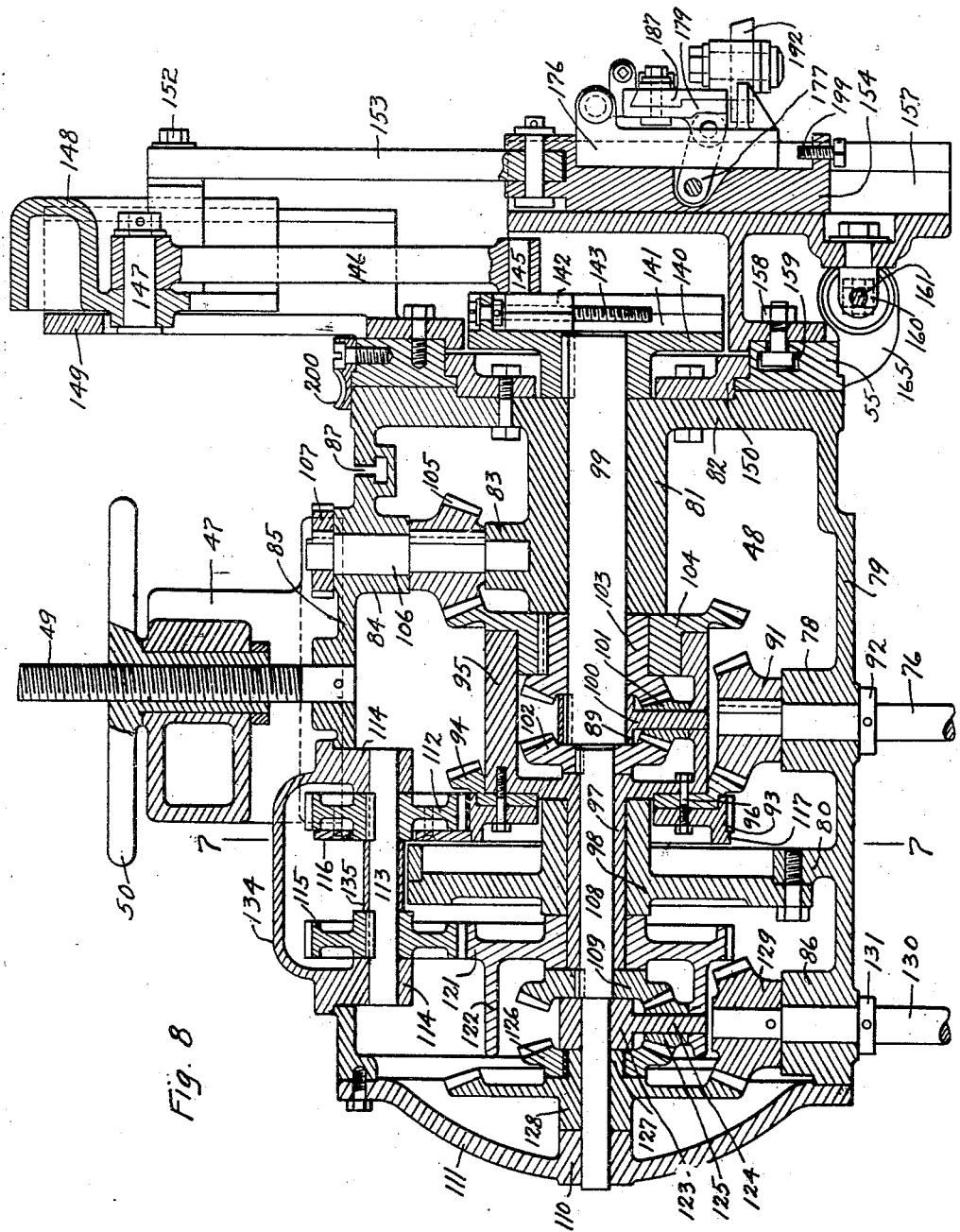

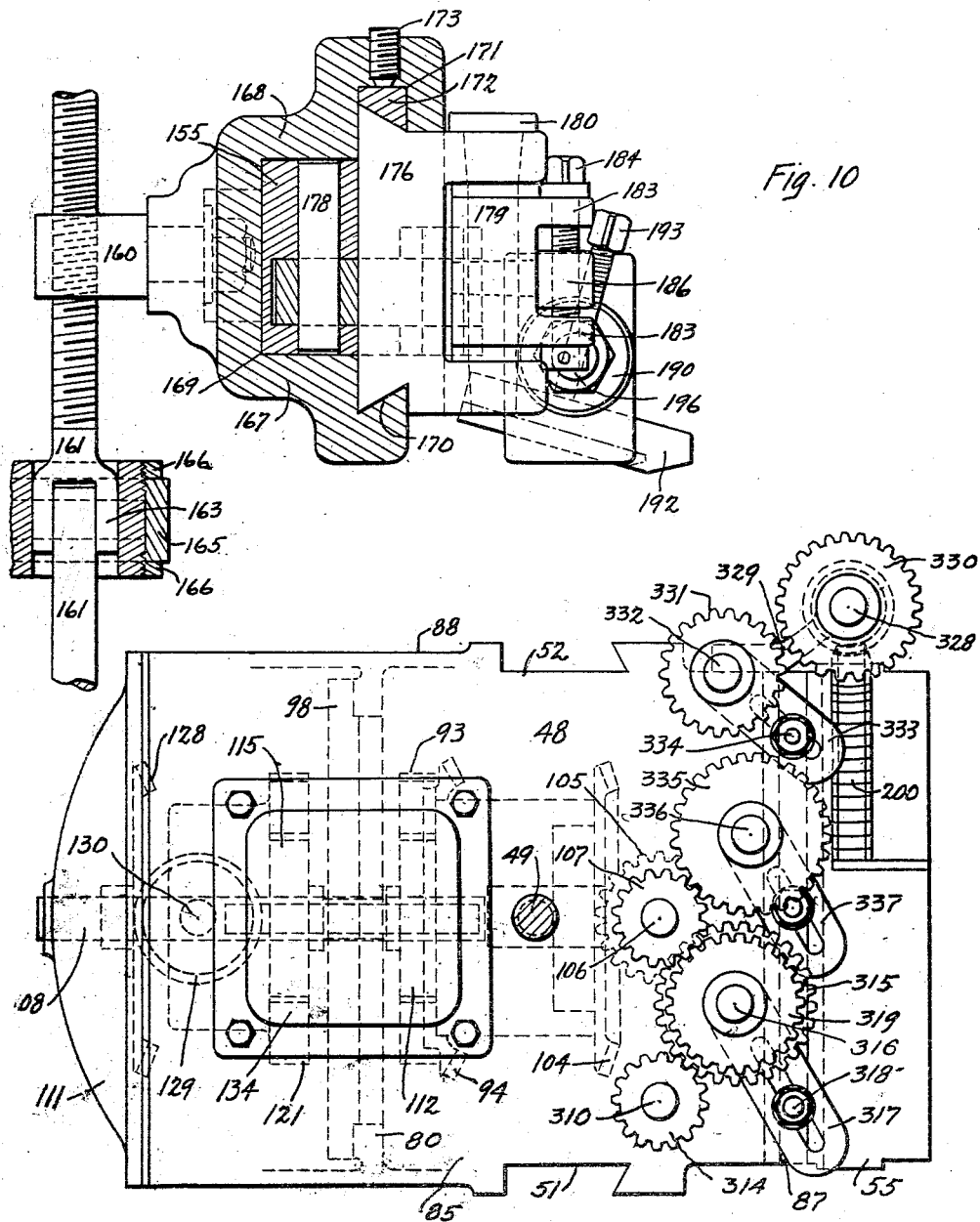

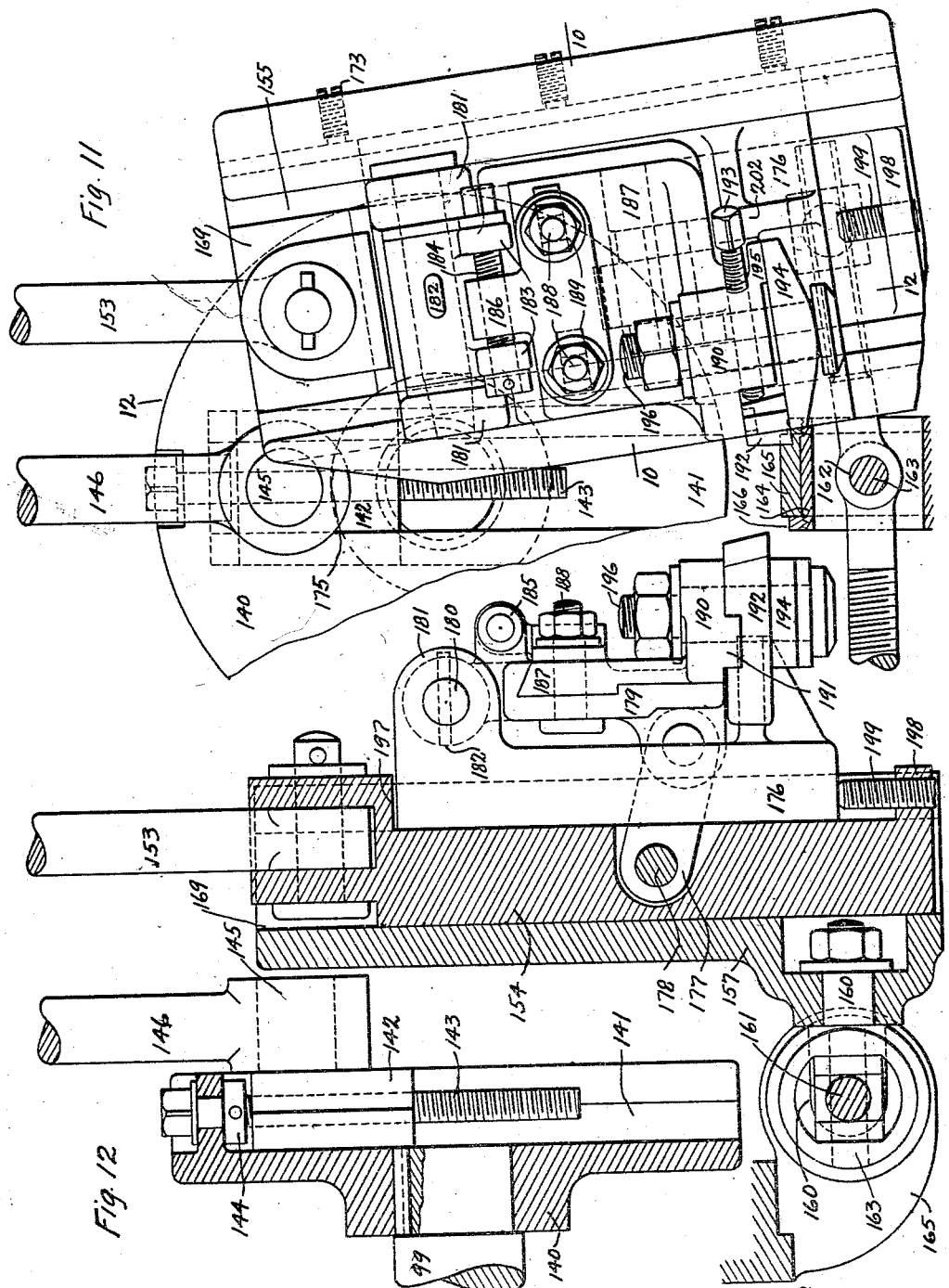

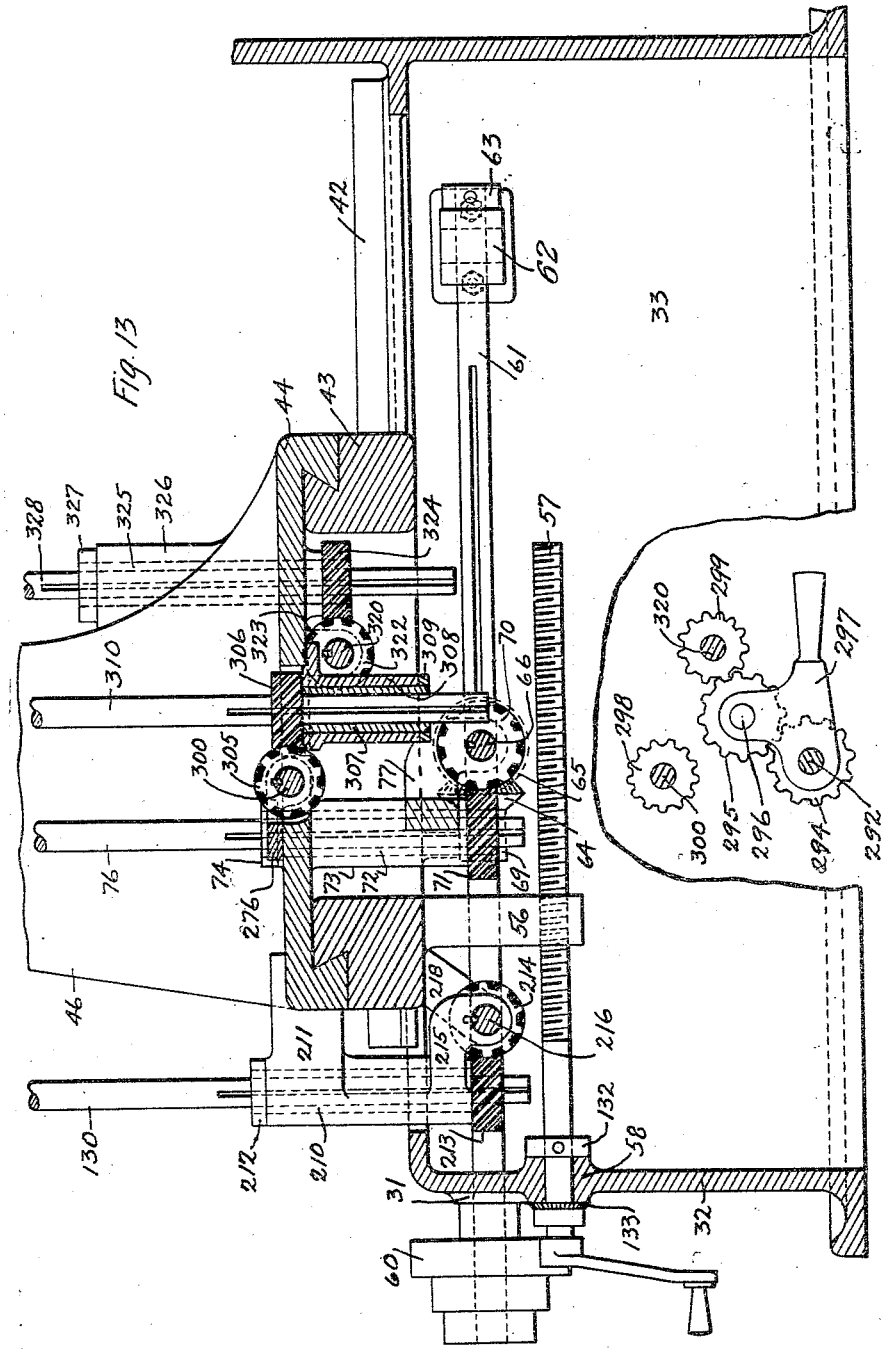

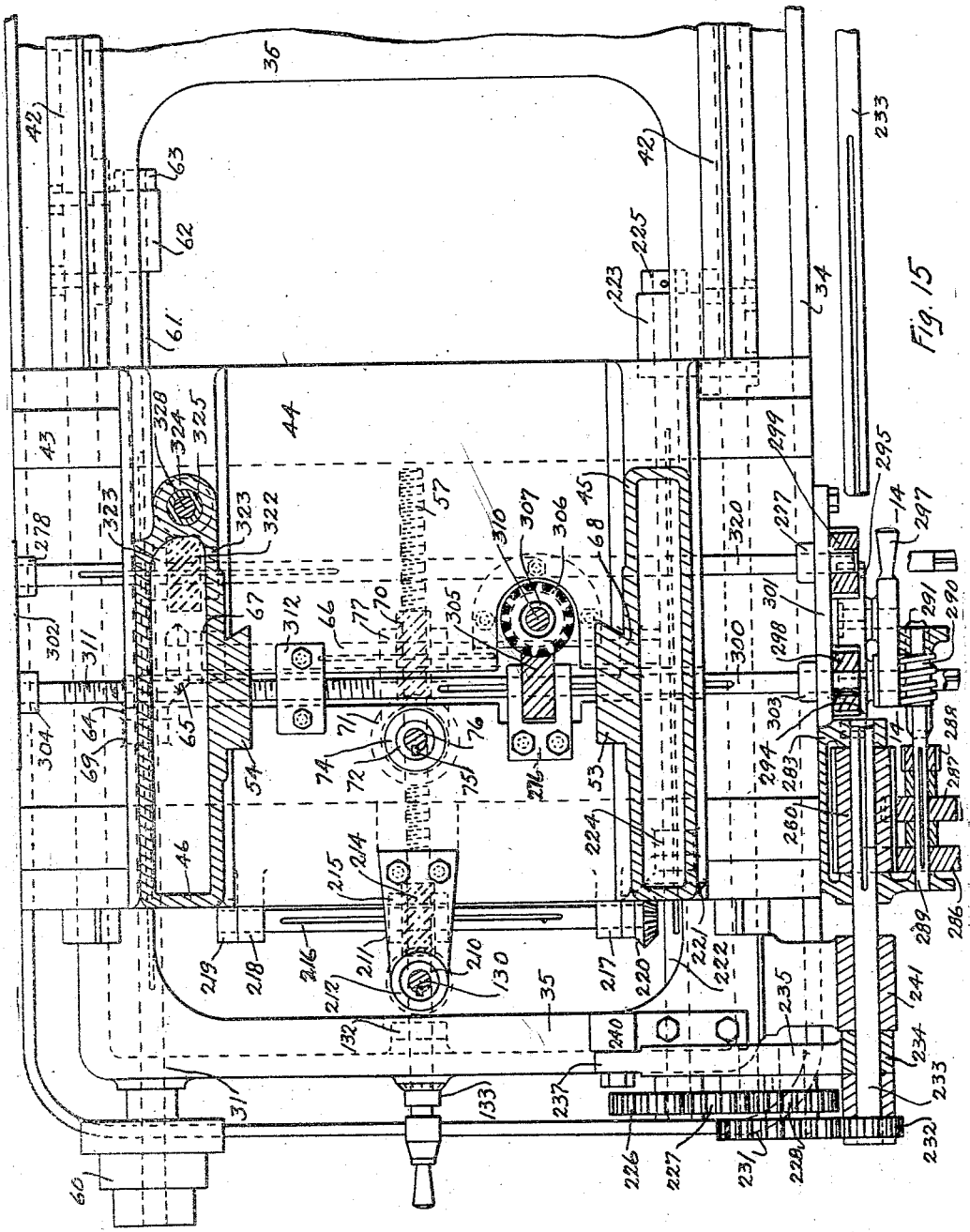

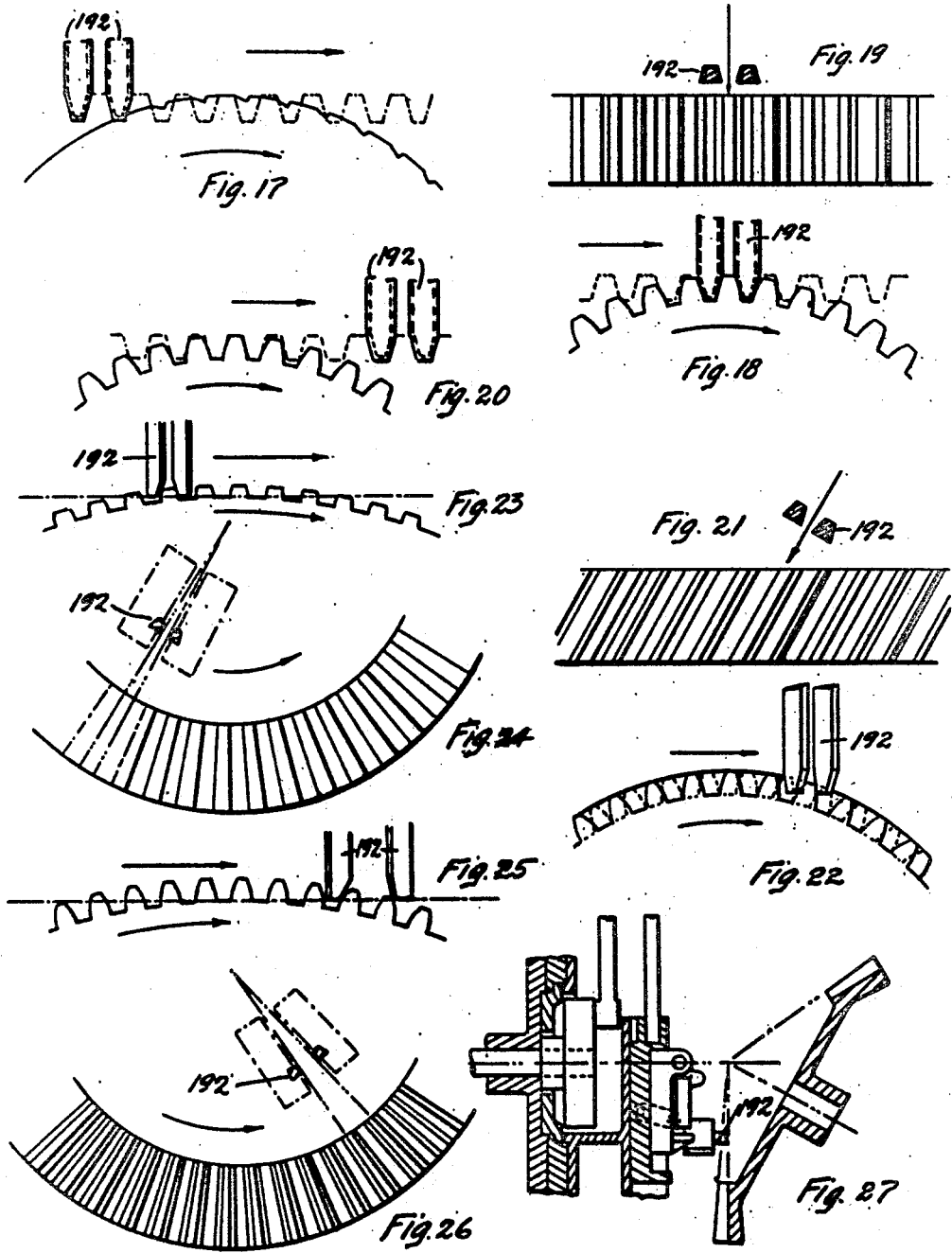

JOHAN ALFRED SVENSSON, OF ROCHESTER, NEW YORK.

GEAR-CUTTING MACHINE.

1,143,602.  Specification of Letters Patent.  Patented June 15, 1915.

Application filed September 8, 1909. Serial No. 516,703.

*To all whom it may concern:*

Be it known that I, JOHAN ALFRED SVENSSON, a citizen of the United States, and a resident of Rochester, in the county of Monroe and State of New York, have invented certain new and useful Improvements in Gear-Cutting Machines, of which the following is a specification.

This invention relates to improvements in gear cutting machines applicable for cutting spur, spiral and bevel gears.

The invention comprises mechanism by which the cutting tools, preferably a pair of them, are caused to assume consecutive operative positions, and while the gear blank is traveling in the same direction with the cutting tools. When cutting spur and spiral gears the consecutive positions constitute an imaginary rack, and for bevel gears the consecutive positions of the cutting tools are the path of the teeth of an imaginary crown gear meshing with the bevel gear blank.

The invention also contains means to automatically index the gear blank operated upon for every cutting stroke of the tools, to produce about the same degree of completion on all the teeth during the cutting operation.

Figure 3:
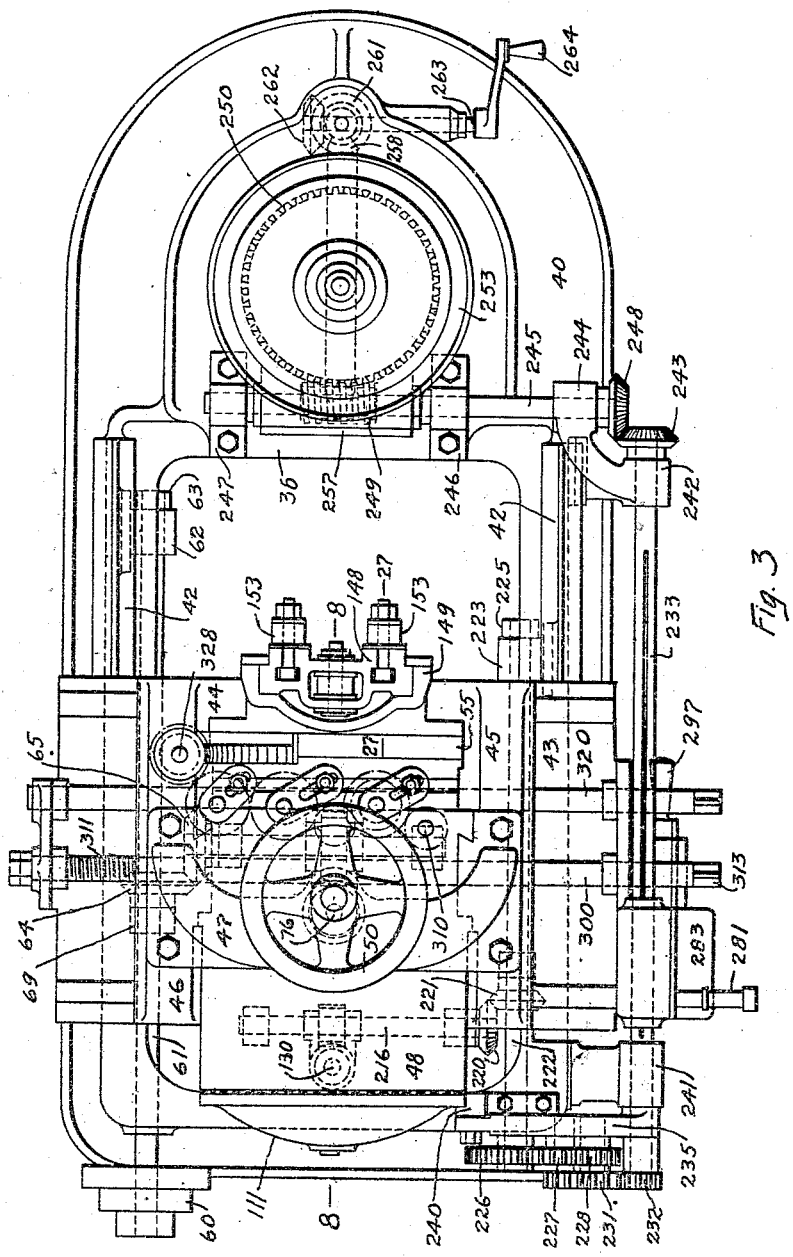
Figure 16:
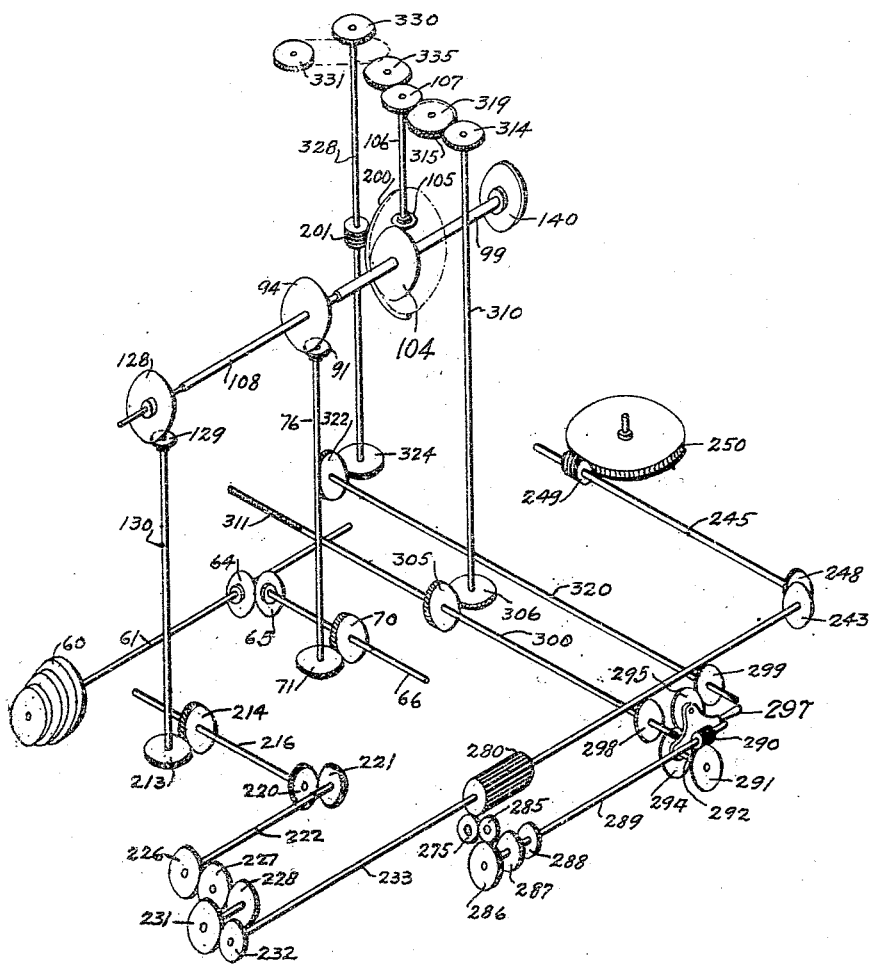

In the accompanying drawings which hereby are made a part of this specification Figure 1 is a front elevation of the invention, parts thereof being shown in section, adapted to cut spur gears. Fig. 2 is a partial front view of the gear blank carrying device shown in Fig. 1, tilted in position for a bevel gear blank, contiguous parts being shown in section. Fig. 3 is a top plan view of Fig. 1. Fig. 4 is an enlarged right hand side elevation of Fig. 1 with some of the elements in a changed position. Fig. 5 is an enlarged left hand side elevation of Fig. 1. Fig. 6 is an enlarged partial right hand side elevation of Fig. 1. Fig. 7 is a section on the line 7—7 of Fig. 8. Fig. 8 is an enlarged partial sectional elevation of Fig. 3 on the line 8—8, showing particularly the driving and indexing mechanism. Fig. 9 is an enlarged partial top plan view of Fig. 1, showing particularly the feed transmitting gearing. Fig. 10 is a partial section on the line 10—10 of Fig. 11. Fig. 11 is an enlarged portion of Fig. 6. Fig. 12 is a partial section on the line 12—12 of Fig. 11. Fig. 13 is a partial section on the line 13—13 of Fig. 5. Fig. 14 is a partial sectional front elevation of Fig. 15 on the line 14—14. Fig. 15 is a partial enlarged section on the line 15—15 of Fig. 1. Fig. 16 is an isometrical elevation of the driving and feed shafts with their respective gears, the contiguous parts of the machine being omitted. Fig. 17 is a diagrammatical bottom plan view of the cutting tools in their initial positions for a spur gear blank. Fig. 18 is a view similar to that shown on Fig. 17 with the cutting tools advanced to their central positions. Fig. 19 is a diagrammatical rear elevation of Fig. 18. Fig. 20 is a view similar to Fig. 17 with the cutting tools at the opposite end of their travels. Fig. 21 is a diagrammatical rear elevation showing the central position of the cutting tools adapted to operate on the spiral gear. Fig. 22 is a diagrammatical bottom plan view of Fig. 21. Fig. 23 is a diagrammatical bottom plan view of the position of the cutting tools when both of said tools are cutting on a single tooth of a bevel gear. Fig. 24 is a diagrammatical rear elevation of Fig. 23. Fig. 25 is a diagrammatical bottom plan view of the cutting tools arranged for simultaneously cutting two teeth of a bevel gear. Fig. 26 is a partial diagrammatic rear elevation of Fig. 25 and Fig. 27 is a diagrammatic section on the line 27—27 of Fig. 3.

With my invention there are obtained means by which either straight or tapered teeth may be cut. By my construction forming tools as well as the simultaneous moving of the gear blank and cutting tools are dispensed with.

In the drawings the numeral 30 represents a supporting base with an extension 40 that carries a gear blank supporting table 41 (Fig. 1). The upper portion of the said base 30 has formed therewith inverted V guides 42 on which is slidingly mounted a supporting plate 43. The latter has slidingly attached thereto a sliding plate 44 from which extend the housings or uprights 45 and 46. A yoke 47 connects the upper portion of the said uprights 45 and 46 and supports a head 48, by means of a stud 49 secured in the latter (Fig. 8). The said stud 49 is in threaded engagement with a hand wheel 50, that is rotatably secured in the yoke 47 (Figs. 7 and 10). The head 48 is provided with dovetailed recesses 51 and 52, that engage correspondingly formed projections 53 and 54 on the housings 45 and 46 to keep the said head 48 in alinement therewith. A tool guide carrying ring 55 is adjustably mounted on the head 48, whereby the said guide ring 55 may be swung through a predetermined angle as will be more fully hereinafter described.

The supporting and sliding plates 43 and 44 may be adjusted to locate the tool carrying head 48 in operative position over the gear blank table 41. The said supporting plate 43 is provided with a downwardly extending arm 56 that is in threaded engagement with a screw 57, one end of which is supported in a boss 58 in the left hand side 32 of the base 30. Collars 132 and 133 maintain the said screw 57 in position in the boss 58. The said collar 133 is provided with graduations by which the movements of the screw 57 and the plate 43 can be accurately predetermined (Figs. 13 and 15).

Motion is imparted to the various interconnected mechanisms of the machine, by means of a step cone pulley 60. The said pulley 60 is secured to the end of the shaft 61, adjacent to a bearing 31 formed with the base 30 (Fig. 15). One end of the shaft 61 is journaled in the bearing 31 and the other end in a bearing 62 which is bolted to the inner face of the base 30 at the rear side 33 thereof. A collar 63 on the right hand end of the said shaft 61 adjacent to the bearing 62 maintains the said shaft 61 in position. A miter gear 64 is slidably supported on the shaft 61, and is in meshing engagement with a coacting miter gear 65 that is secured on one end of a transverse shaft 66. The latter is journaled in the bearings 67 and 68 extending downwardly from the underside of the supporting plate 43. A similarly depending bearing 69, adjacent to the hub end of the gear 64 maintains the latter in engagement with the gear 65 (Figs. 13 and 15). A spiral gear 70 is driven by the shaft 66 and is slidingly mounted thereon. The said gear 70 meshes with a spiral gear 71 which is attached to the lower end of a sleeve 72, which is rotatably mounted in a hub 73 extending downwardly from the underside of the sliding plate 44. A collar 74 maintains the said sleeve 72 in position. A spline 75 in the sleeve 72 transmits motion from the said sleeve to a shaft 76 that is slidingly connected therewith. Ears 77 formed with the hub 73 straddle the gear 70, and keep the latter in engagement with the spiral gear 71 while the said gear 70 is being translated on the shaft 66. The upper end of the shaft 76 is journaled in a bearing 78 formed with the head 48 in the lower side 79 thereof. A bevel pinion 91 is keyed to the upper end of the said shaft 76, and a collar 92 on the latter adjacent to the bearing 78 maintains the axial position of said shaft 76. An intermittent gear 93 and a bevel gear rim 94 are secured to one end of a cylindrical shell 95 by means of bolts 96. A shank 97 extending from the former is journaled in a bearing 98, which is bolted to an inwardly projecting flange 80 formed with the head 48. The said bevel gear rim 94 meshes with the pinion 91 whereby motion is imparted to the shell 95. A sleeve 89 is keyed to one end of a shaft 99, that is journaled in a bearing 81 projecting in the head 48 at the right hand side 82 thereof. The said sleeve 89 has extending therefrom a stud 100, the outer end of which is in engagement with the shell 95, whereby rotation is transmitted from the said shell 95 to the shaft 99. A bevel pinion 101 is rotatably mounted on the stud 100 and is in meshing engagement with bevel gears 102 and 103. The latter is rotatably mounted on the shaft 99 and the said gear 103 has keyed thereto a bevel gear 104. The hub of the latter forms an extension bearing for the shell 95. The said bevel gear 104 meshes with the pinion 105, that is keyed to a shaft 106. The said shaft 106 is journaled in a socket 83 formed on the upper portion of the bearing 81, and also in a bearing 84 projecting downwardly from the head 48 at the top side 85 thereof. A spur pinion 107 is secured to the upper end of shaft 106 and coacts with the feed mechanism of the machine which will be more fully hereinafter described. The speed of motion as well as rotation in either direction of the pinion 105 imparts a relative motion to the coacting gears 103 and 104. The gear 102 and the pinion 101 which are in meshing engagement with each other are jointly controlled by the gear 103 and may be given a differential rotation by operating the pinion 105. The pinion 101 and the gears 102, 103 together constitute what may be termed the primary differential mechanism. The said gear 102 is keyed to one end of a shaft 108 which is journaled in the shank 97 of the shell 95. A bevel gear 109 is keyed to the other end of the said shaft 108 which is supported in a bearing 110 formed in a side cover plate 111, that incloses the left hand side of the head 48. The intermittent gear 93 meshes with a pinion 112 which is keyed to one end of a shaft 113. The latter is journaled in bearings 114 that project downwardly from a top cover plate 134. A pinion 115 is keyed to the other end of the said shaft 113 and a spacing sleeve 135 mounted on the latter separates the pinions 112 and 115. The said pinion 112 has attached thereto a locking plate 116 which engages a flange 117 projecting from the left hand side of the intermittent gear 93 (Figs. 7 and 8). Recesses 118 formed with the said flange 117 adjacent to the terminal teeth 119 of the intermittent gear 93, provide clearances for the corners 120 of the locking plate 116 on the pinion 112, when the latter is turned by the said gear 93. The number of teeth on the intermittent gear 93 extends around one-half of the periphery thereof and is equal to the number of teeth around the whole periphery of the pinion 112 by virtue of which the shaft 113 has imparted to it one revolution for one-half revolution of the intermittent gear 93. During the remaining half revolution of the gear 93, the shaft 113 is held at rest by the locking plate 116. This effect is produced by virtue of the intermittent gear 93, which is twice the diameter of the pinion 112, having teeth only on one-half of the circumferential surface. The pinion 115 gears with the gear 121 that is rotatably mounted on the shank 97 of the shell 95, between the bevel gear 109 and the bearing 98. The said gear 121 has extending from the left hand side thereof a cylindrical shell 122. A sleeve 123 is rotatably mounted on the shaft 108 and has extending therefrom a stud 124, the outer end of which stud is in engagement with the said shell 122. A bevel pinion 125 is rotatably mounted on the said stud 124 and gears with the bevel gear 109, and also with the bevel gear 126. The latter is keyed on a hub 127 of a bevel gear 128. The said pinion 125 and the gears 109, 126 together constitute a secondary differential mechanism. The said gear 128 is rotatably mounted on the left hand portion of the shaft 108 and is in meshing engagement with a bevel pinion 129. The latter is secured to the upper extremity of a shaft 130 which is journaled in a bearing 86 formed with the head 48 in the underside 79 thereof. A collar 131 maintains the axial position of the said shaft 130 in the bearing 86. The gear 121 being double the diameter of the pinion 115 it makes half the number of revolutions of the latter. The rotation of the said pinion 115 being interrupted by consecutive intervals of rest, as hereinbefore described, the gear 121 will therefore make a half revolution to a half revolution of the intermittent gear 93, but will remain at rest for the remaining half revolution of the said gear 93. The combined sleeve 123 and stud 124, which latter carries the pinion 125, have correspondingly timed periods of motion imparted to them on account of being driven by the said gear 121. As already stated, the bevel gear 109 is by interposed mechanism in positive engagement with the pinion 105. The said gear 109 also engages the pinion 125 the teeth of which mesh with the teeth of the gear 126 fastened to the gear 128 that coacts with the pinion 129 on the shaft 130. Any movement imparted to the said pinion 105 is transmitted to the said shaft 130. The said pinion 125 has also intermittent periods of rotation transmitted thereto by the mechanism previously described by reason of which the said shaft 130 will have similar periods of rotation. The said shaft 130 is thus actuated upon by two distinct separate sources of motion, one feed transmitting motion from the pinion 105 positively operated from the feed mechanism, and one drive motion transmitted intermittently from the said pinion 91 which is in positive engagement with the drive mechanism. The latter motion imparted to the shaft 130 indexes the gear blank one tooth while the cutting tools hereinafter described, advance deeper into the blank at every cutting stroke. The motion imparted by the feed operative gear 105 controls and rotates the gear blank in a manner to move the pitch line of the gear blank harmoniously with the pitch line of the imaginary rack in the loci of which the cutting tools operate. A proper relative ratio of movement and direction between the feed gearing and the pinion 105 accomplishes this action, which is more fully hereinafter described.

The shaft 99 has keyed at the right hand end thereof a disk 140, having a T slot 141 and a block 142 is adjustably located in the said slot 141. The position of the said block is regulated by a screw 143 that is in threaded engagement therewith. A collar 144 maintains the said screw 143 in operative position in the disk 140. (Fig. 12). The block 142 has extending therefrom a crank pin 145 that connects the one end of a connecting rod 146. The other end of the said rod supports one end of a wrist pin 147, the other end of which is secured in a sliding head 148. The said head 148 is slidingly mounted in an upper guide 149 that is bolted to the tool guide ring 55. The latter is held in position against the head 48 by a plate 150. The said sliding head 148 is provided with a pair of slots 151 and clamping pins 152 are adjustably secured in the said slots. Connecting links 153 connect the said pins 152 with a pair of sliding blocks 154 and 155 which are slidingly mounted in their respective lower guides 156 and 157. (Figs. 6 and 8) The latter are adjustably secured to the said tool carrying ring 55 by means of bolts 158 engaging arc shaped slots 159 in the tool carrying ring 55. The lower guides 156 and 157 have at their rear portions the swivel sockets 160, and the said sockets are threaded internally to receive a jointed hand wheel screw 161. (Figs. 10, 11 and 12.) The central portion 162 of the said screw 161 is pivoted on a pin 163 that is carried in a sleeve 164 which is rotatably mounted in an ear 165 extending from the lower portion of the ring 55. Internally threaded collars 166 engage correspondingly threaded end portions of the said sleeve 164 to maintain the latter in axial alinement with the said ear 165. By loosening the bolts 158, the said guides 156 and 157 may be separated upon being pivotally swiveled around the said shaft 99 a predetermined distance by the said hand wheel screw 161, the object of which will be more fully hereinafter described. Side portions 167 and 168 extend from the rear of the said guides 156 and 157 and form therewith a rear straight sided recess 169. Adjacent to the front portion of the recess 169 a front dovetailed recess 170 and a front straight sided recess 171 are formed. The latter is provided with a beveled gib 172 that is adjusted by means of said screws 173 which are in threaded engagement with the side 168. The sides 167 of the said guides 156 and 157 are beveled at their upper inside corners 174 and 175 to clear each other when their lower portions are spread apart. The said pair of sliding blocks 154 and 155, the guides 156 and 157 and the therewith connected elements will hereinafter be described only for one side of the machine and will be referred to as the sliding block 155 and the guide 157. The sliding block 155 engages the said rear straight sided recess 169 and is connected with a tool slide 176 by means of a link 177. One end of the latter is pivoted on a pin 178 that is carried in the said sliding block 155 and the other end of the said link 177 is suitably hinged to an arm 179. The latter is pivoted on a pin 180 which is journaled in ears 181 formed with the upper portion of the said tool slide 176. A key 182 secures the arm 179 to the said pin 180 and the former has extending therefrom ears 183 in which is rotatably carried a screw 184 which is maintained in alinement with the ears 183 by a collar 185. The said screw 184 has a threaded portion in engagement with a lug 186 that is formed integral with an adjustable member 187 whereby the latter is shifted laterally on the arm 179, the purpose of which will be more fully hereinafter described. Bolts 188 in the slots 189 clamp the said adjustable member 187 to the said arm 179. The latter has formed therewith a hub 190 from the under side of which extends a lip 191 that holds a cutting tool 192 against the pressure of a set screw 193 which is in threaded engagement with the said hub 190. A clamping plate 194 keeps the said tool 192 in a fixed position. The said plate 194 bears against the under side of the tool 192 as well as against the ledge 195 that is formed with the under side of the said hub 190. A bolt 196 passes through the plate 194 and the hub 190 by which the tool 192 is rigidly clamped to resist the strain thereon due to the cutting action of the latter on the gear blank operated upon. A knee 202 extending from the tool slide 176 resists the side thrust on the arm 179. The tool slide 176 moves in the path of the sliding block 154 and the latter has a top ledge 197 and a bottom led 198. An adjusting screw 199 in the said bottom ledge 198 controls the vertical motion of the said slide 176, between the said screw and the top ledge 197. The tool slide 176 is frictionally held between the dovetailed recess 170 and the adjustable beveled gib 172. On the downward stroke of the sliding block 154 the said tool slide 176 is in contact with the top ledge 197 and on the instant of the reversal of the said sliding block 154 the tool slide 176 is at rest. At the beginning of the upward movement of the sliding block 154 and during the brief interval when the tool slide 176 remains at rest the arm 179 is pulled inwardly by the link 177. The said tool slide 176 remains motionless during this interval due to the frictional resistance of the gib 172, the link 177 as previously stated is connected up with the said sliding block 154 and therefore it moves the cutting tool 192 inward out of cutting engagement with the gear blank operated upon as just stated. When the adjusting screw 199 strikes the said tool slide 176 the latter moves upwardly with the sliding block 154. At the beginning of the return down stroke the tool slide 176 is at rest for another brief interval, during which the said link 177 pushes the arm 179 outwardly into operative position until the top ledge 197 strikes the said tool slide 176 whereby the latter moves downwardly together with the sliding block 154. The length of stroke of the cutting tools suitable to the face of the gear is obtained by adjusting the block 142 in the disk 140. The vertical position of the sliding blocks 154 and 155 in the guides 156 and 157 is determined by the location of the clamp pins 152 in the slots 151 of the sliding head 148. The upper guide 149 and the said lower guides 156 and 157 by virtue of being attached to the ring 55 are swung simultaneously around the axial center of the shaft 99. Motion is imparted to the ring 55 by means of a worm segment 200 that is secured thereto. A worm 201 engages the worm segment 200, the purpose of which will be more fully hereinafter described.

The shaft 130 is in slidable engagement with a sleeve 210 and imparts thereto the intermittently feed controlled rotation hereinbefore described, by means of a suitable spline therein (Figs. 13, 15 and 16). The said sleeve 210 is rotatably carried in a bracket 211 which is bolted to the sliding plate 44. The sleeve is maintained in axial alinement with the said hub 211 by means of a collar 212 that is attached to the upper end of the sleeve, and by a spiral gear 213 secured to the lower end of the sleeve. The gear 213 gears with a coacting gear 214 which is held in engagement therewith by lugs 215 extending from the hub bracket 211. The gear 214 is slidingly mounted on a shaft 216 which it rotates. The latter is journaled in bearings 217 and 218 that depend from the under side of the supporting plate 43. The said shaft 216 is maintained in axial alinement by a collar 219 fastened to one end thereof and by a miter gear 220 secured to its other end. The teeth of the miter 220 mesh with a corresponding gear 221 that is slidingly mounted on a shaft 222 driven thereby. The right hand end of the said shaft 222 is journaled in a bearing 223 that is bolted to the base 30 on the inner face of the front side 34 thereof. A bearing 224 depending from the under side of the said supporting plate 43 adjacent to the gear 221 secures engagement between the latter and the coacting gear 220. The left hand portion of the said shaft 222 passes through the left hand side 32 of the base 30 and is journaled therein. The shaft 222 is held from axial motion by means of a collar 225 that is fastened to the right hand end of the former, adjacent to the bearing 223.

A spur gear 226 is secured to the left hand end of the shaft 222. The gear 226 gears with a gear 227 which is in engagement with a pinion 228. The said gear 227 is rotatably mounted on a stud 229 and the pinion 228 is similarly mounted on a stud 230 (Figs. 5 and 15). A gear 231 is also mounted on the said stud 230 and is arranged to rotate with the pinion 228. The said gear 231 meshes with a pinion 232 that is secured to the left hand end of a shaft 233, adjacent to a hub 234 of an arm 235. The hereinbefore described studs 229 and 230 are adjustably mounted in a slot 236 of the said arm 235. The latter has an extension 237 which is provided with a slot 238. A bolt 239 engages the said slot 238 and clamps the arm 235 in operative position. (Fig. 5.) The bolt 239 is in threaded engagement with a hub bracket 240 that is bolted to the base 30 at the left hand portion of the top side 35 thereof. The said shaft 233 is journaled in a left hand bearing 241 and in a right hand bearing 242 that are bolted to the front side 34 of the base 30. (Fig. 1.)

A miter gear 243 is secured to the right hand end of the said shaft 233 adjacent to the bearing 242. The latter has formed therewith at right angles thereto a branch bearing 244 in which is journaled one end of a shaft 245. The other end of the said shaft 245 is journaled in bearings 246 and 247 which are bolted to the right hand portion of the top side 36 of the base 30. (Figs. 3 and 5.) The said shaft 245 has secured thereto a miter gear 248 that gears with the gear 243. A worm 249 is secured on the shaft 245 and the former is in engagement with a worm wheel 250. The latter has formed with the lower portion thereof an inwardly extending flange 251 that is bolted to a foot flange 252 of a subtable 253. (Fig. 1.) The said table 253 has secured thereto a socket 254 which receives a mandrel 255 that carries the gear blank to be operated upon. The said subtable 253 is journaled in an annular shell 256 that is attached to the main table 41. The said shell 256 has formed therewith a projecting portion 257 that is pivoted on the shaft 245, whereby the shell 256 and the therewith connected elements can be swung around the axial center of the shaft 245 while at the same time the subtable 253 is rotated. The said main table 41 has extending therefrom a toothed segment 258 that is engaged by a worm 259 which is formed with a shaft 260. (Figs. 1 and 4.) The latter has attached to the lower portion thereof a miter gear 261 which coacts with a gear 262 that is secured to one end of a shaft 263. A hand crank 264 is secured to the other end of the said shaft 263 whereby the table 41 and the therewith coacting elements may be swung in a predetermined angular position relative to the plane of the cutting tools, which will be more fully hereinafter referred to. The said shafts 260 and 263 are carried in bearings respectively numbered 265 and 267 which are formed with a frame extension 40.

A wide faced pinion 280 is slidingly mounted on the shaft 233 and is suitably driven thereby. A shiftable arm 281 is slidingly connected to a rod 282 that is located in a box frame 283, which also contains the pinion 280. A stud 284 is carried by the said arm 281 and a pinion 285 is rotatably mounted on the former. The teeth of the pinion 285 mesh with the teeth of a gear 275 which is also shiftable by the said arm 281. The latter gear engages the said pinion 280. The pinion 285 can engage either one of gears 286, 287 or 288 that are keyed on one end of a shaft 289 which is journaled in the said box 283. A predetermined relative difference in rotation can thereby be transmitted to the said shaft 289 to provide a feed suitable to the pitch and diameter of the gear blank operated upon. The said shaft 289 has attached to the other end thereof a worm 290 that meshes with a worm wheel 291 which is secured on a shaft 292. The said shaft 292 has one end thereof journaled in the rear wall of the box 283 and the other end in a cover 293 of the said box 283, (being removed in Fig. 1.) A spur gear 294 is secured to the shaft 292 and gears with a gear 295. The latter is rotatably carried on a stud 296 secured in an arm 297, which is pivoted on the said shaft 292. The said gear 295 can engage either one of gears 298 or 299. The former is secured to one end of a shaft 300 which is journaled in a rear portion 301 of the said box 283. The other end of the said shaft 300 is journaled in a projecting portion 302 of the supporting plate 43. (Figs. 3, 5 and 15.) Collars 303 and 304 are fastened on the said shaft 300 adjacent to the bearing portions 301 and 302, which maintains the former in axial alinement. A spiral gear 305 is slidingly mounted on and driven by the said shaft 300. The former is maintained in engagement with a coacting gear 306 by a forked bracket 276 that is bolted to the sliding plate 44. The said gear 306 is secured to one end of a sleeve 307 which is rotatably mounted in a hub 308. The latter is attached to the under side of the sliding plate 44. A collar 309 maintains the said sleeve 307 in position in the said hub 308 and a shaft 310 with the lower portion thereof in slidable engagement with the sleeve 307 is rotated thereby. (Fig. 13.)

The shaft 300 is provided with screw threads 311 that engage a stationary-nut 312 which is attached to the sliding plate 44 whereby the latter is moved transversely on the supporting plate 43. The said shaft 300 has formed at one end thereof a square portion 313 to which a hand crank or other suitable wrench can be applied to rotate the shaft 300 and the therewith connected elements manually. (Fig. 3.) The upper end of the said shaft 310 passes through the head 48 and is suitably journaled in the top and bottom sides respectively 85 and 79 thereof. (Fig. 9.) A pinion 314 is secured to the top of the shaft 310, the former meshing with the gear 315 that is rotatably carried on a stud 316 which extends up from a slotted arm 317. The said arm 317 is clamped in position by means of a bolt 318 which has the lower end thereof located in a T slot 87 that is formed with the top side 85 of the head 48. A gear 319 is also mounted on the said stud 316 and is arranged to rotate with the gear 315. The said gear 319 gears with the pinion 107 on the shaft 106 which as hereinbefore described controls the gear blank actuating mechanism through the intervening differential gearing. By selecting a proper ratio of gears in the closed circuit or cycle of gearing between the said shafts 106 and 310, the rotation of the gear blank at a predetermined angular velocity harmonious with the cutting tools will resemble the action of a gear and a rack in actual mesh as hereinbefore described. The motion transmitted by the shaft 233 to the gear blank is a simple intermittent rotary motion in one direction while the gear blank supporting table is held stationary in one plane, which motion is the resultant of the combined spacing and feeding converted into a unitary movement for the indexing of the blank.

The gear 299 is secured to one end of a shaft 320 which is also journaled in the rear portion 301 of the box 283. The other end of the shaft 320 is supported in a bearing formed in the said projecting portion 302. Collars 277 and 278 maintain the axial alinement of the said shaft 320 between the bearings 301 and 302. (Figs. 4 and 15.)

A spiral gear 322 is driven by the shaft 320 and is arranged to slide thereon. Ears 323 depending from the under side of the sliding plate 44 maintain the said gear 322 in engagement with a coacting spiral gear 324. The said gear 324 is secured to the lower end of a sleeve 325 that is rotatably supported in a boss 326 of the housing 46. A collar 327 fastened to the upper end of the said sleeve 325 maintains the latter in position. A shaft 328 is suitably driven by the sleeve 325 and is free to slide therein. The upper portion of the said shaft 328 is located alongside the head 48 at the rear side 88 thereof by means of a bracket 329 that is attached to the former. (Fig. 9.) The said shaft 328 has secured thereto the worm 201 which meshes with the worm segment 200 of the ring 55 as previously described. A gear 330 is secured to the upper extremity of the shaft 328, and gears with a pinion 331 (shown disconnected in Fig. 9) that is rotatably mounted on a stud 332 which extends from a slotted arm 333. The latter is clamped in position to the top side 85 of the head 48 by means of a bolt 334 that has the lower end thereof in engagement with the T slot 87 of the said head 48. The pinion 331 is in engagement with a gear 335 that is similarly mounted on a stud 336 of an arm 337, which is also held in position on top of the head 48. The said gear 335 gears with the pinion 107 of the shaft 106 which as already stated controls the gear blank actuating mechanism. The latter mechanism as well as the tool feed actuating mechanism are interconnected and dependent upon each other. The speed of the gear blank indexing mechanism is directly affected by the change gears 226 and 227, pinion 228, gear 231 and pinion 232 on the left hand side of the machine. The ratio of the said change gears is dependent upon the number of teeth to be cut on the gear blank and their proportion is predetermined to index or move the gear blank one tooth space for every cutting stroke of the tools. The rotation of the shaft 233 also affects the tool traversing mechanism and the amount of advance of the latter constitutes the feed, which is under immediate control of the shiftable pinion and gear respectively 285 and 275 and therewith coacting gears 286, 287, 288 and pinion 280. The ratio of the gears 314, 315 and 319 on top at the near side of the head 48 predetermines the relative transmission of rotation from the said shaft 310 to the shaft 106 which as hereinbefore described operates the blank actuating mechanism. The last enumerated gears are in use only when cutting spur and spiral gears and their proportions are changed for the different sizes of pitch of gear teeth to be cut. The gears 330, 331 and 335 on top at the far side of the head 48 are connected up with the gear 107 only when cutting bevel gears and similarly their proportions are changed for the different sizes of pitch to be cut on a bevel gear blank.

From the foregoing it will be seen that the indexing mechanism and the feed mechanism are interconnected, and also that a relative ratio dependent upon the characteristics of the gear to be cut is maintained between the feed and indexing mechanisms by means of a closed cycle of gearing. Furthermore, the characteristics of the gear to be cut are controlled by two independent factors, namely, the number of teeth and the pitch. For each of these, a separate set of change gears is provided, one selected in accordance with the number of teeth to be cut in the blank, and the other in conformity with the pitch to be used. These change gears are operatively connected up with a differential mechanism to the feed mechanism in a closed cycle, so that the movements of the indexing and the feed mechanism are interdependent one upon the other. As stated, there is also provided a nest of gears between the indexing and the feed mechanisms which predetermines the rate of feed. This nest of gears controls both the straight transverse translating movement and the circular translating movement of the tool upon the tool head. The set of change gears for determining the number of teeth is located in the line of motion which comes from the reciprocating mechanism and is converted into intermittent rotary motion affecting the indexing of the blank. The other set of change gears, relating to the pitch, is located in the line of motion connecting the feed mechanism with the differential mechanism and returning to the indexing mechanism in a closed cycle. The advantages of maintaining a closed cycle between the different mechanisms are among others, that if one set of change gears be substituted for the other, the machine can cut a different number of teeth, with the same pitch, and still maintain the relative ratio of the feed and indexing mechanisms. The rate of speed should be comparatively faster for a smaller gear, but as it is dependent upon the pitch the machine will automatically make provision therefor. Again, after substituting different change gears, for instance of a finer pitch, but still retaining the same number of teeth, the machine will automatically index and feed faster without any further attention. This reduces to a minimum the attention that needs to be given to the machine and permits a comparatively inexperienced mechanic to run it without errors. The nest of gears interposed between the indexing motion and the feed motion to determine the rate of feed, is selected in accordance with the material to be cut, it being understood that a cast iron gear can be cut considerably faster than a wrought or cast steel blank without unduly heating the tools.

In describing the functions of my invention I will first describe its operation with a spur gear blank. The latter is mounted on an arbor or spindle that is secured in the socket 254 on top of the subtable 253. The supporting plate 43 with the sliding plate 44, the housings 45 and 46, the head 48, the tool guides carrying ring 55 and the tool slides 156 and 157 with the tools 192 are moved longitudinally on the V guides 42 by the screw 57 until the nose portions of the cutting tools 192 bear on the circumferential surface of the gear blank. From this position the cutting tools are advanced a certain amount depending upon the cut to be taken on the gear blank. The teeth on the gear blank can be finished in one or more settings and the cutting depth for the teeth is accurately adjusted by the graduated collar 133 on the said screw 57. (Figs. 1 and 13.) The sizes of the cutting tools required depend upon the pitch to be cut and two sizes of said tools are shown in full and dotted lines in Fig. 10. The cutting edges of the tools conform to the contour of the teeth of a rack of equal pitch as those required for the gear blank to be operated upon. The thickness of the gear teeth is controlled by the width of the spaces between the inside edges of the nose portions of the said cutting tools 192. The width of said spaces is regulated by the screw 184 and the adjustable member 187. The width of the face of the gear blank plus the travel of the tool slides 176 in relation to the blocks 154 and 155 (the travel of which is required to swing the arms 179 from or into operative position) determines the length of stroke of the sliding blocks 154 and 155 that are connected up with the sliding head 148. The travel of the latter is dependent upon the radius arm of the adjustable crank pin 145. During the interval of time when the cutting tools are on the upward stroke and swung away from the gear blank the latter is indexed. By a suitable combination of the gears 226, 227, 228, 231 and 232 on the left side of the machine, the indexing can include one or more tooth spaces at each indexing movement of the gear blank. By spreading the tool carrying adjustable members 187 the tools can cut either on the flanks of one tooth or on the flanks of two adjacent teeth. The advantages of both of these adjustments are that any irregularity and backlash in the actuating mechanism, or springing on the cutting tools will be divided, because the same point on the gear blank is indexed in subsequent revolutions thereof and it will be minimized and rectified. The cutting operation begins when the cutting tools 192 are in the position indicated in the diagrammatic plan view Fig. 17 which shows the right hand tool beginning to notch the circumferential surface of the gear blank. As before mentioned the tools are adjusted to cut into the gear blank a desired depth and this first location is obtained by moving the sliding plate 44 on the supporting plate 43 by rotating the shaft 300 manually. Next the gear 295 is swung into meshing engagement with the gear 298 that rotates the said shaft 300. The motion of the gear 295 is imparted thereto by the shaft 233 through the adjustable change gearing in the box 283. The speed of rotation of the shaft 233 is reduced by the worm and worm gear respectively 290 and 291. The latter drives the spur gear 294 which transmits motion to the gear 295 by which the gear 298 is rotated. The rotative motion of the shaft 300 axially moves the nut 312 by reason of the screw threads 311 engaging therewith. The said nut 312 moves the supporting plate 44 with the head 48 and the tools 192 transversely in predetermined successive intervals while the indexing takes place. The cutting tools in one working cycle make one upward and one downward stroke and during the former while the cutting tools are swung out of engagement with the blank the indexing mechanism is operative and the cutting tools are moved transversely into a new predetermined position. The said transverse movement is comparatively small being reduced from the shaft 233 through the worm and worm gear respectively 290 and 291 and the said nut and screw threads respectively 312 and 311. This motion is proportioned to move the tools during a complete rotation of the gear blank an amount suitable for a new cut. During the downward or cutting stroke of the tools the indexing and the feed mechanisms are held stationary by reason of the plate 112 locking in the flange 117 of the intermittent gear 93. (Figs. 7 and 8.) Consequently the loci of the different positions of the cutting tools constitute the teeth of a rack.

The central position of the tools in relation to the gear blank in shown in plan and rear elevation respectively in Figs. 18 and 19. The gear blank operated upon will rotate a number of times during the traversing motion of the cutting tools depending upon the feed used. When the latter have entirely passed across the face of the gear blank as shown in Fig. 20 all the cutting sides and corners of the tools have been in actual cutting contact with the gear teeth which therefore have theoretically perfect form.

When cutting a spiral gear the tool guide carrying ring 55 is rotated to an angular position corresponding to the requisite angle of the teeth. This is obtained by manually turning the shaft 320 which rotates the shaft 328 and the worm 201 that meshes with the worm segment 200. This position of the tools is indicated in Figs. 21 and 22 and also in Fig. 4 with the exception that the guides 156 and 157 are parallel with each other instead of being inclined as shown. Otherwise the operations are identically the same as for cutting spur gears. The change gears 315 and 319 on the head 48 are also used for controlling the speed of the pinion 105 and therewith the coacting differential gearing.

In cutting a bevel gear the gear blank supporting table is tilted to bring a plane passing through the bottom of the gear teeth to be cut parallel with the line of motion of the cutting tools. (Fig. 27.) The cutting tools must move in paths parallel to the sides of a tooth. This is obtained by suitably adjusting the guides 156 and 157 by means of the hand wheel screw 161. The apex of the gear cone must coincide with the center of the operating shaft 99 by reason of the tool guides 156 and 157 being pivoted centrally with the said shaft 99. The width of the nose portion of the cutting tools is determined by the space at the small end of the gear teeth. The cutting tools only cut on one side of the teeth due to their convergence. The said cutting tools 192 have a reciprocating motion, while the ring 55 to which the guides for the said tools are attached is rotated. By the latter action of the tools their consecutive positions assume the loci of a crown gear, the teeth of which latter represent the different positions of the cutting tools 192. In the latter case the initial cutting takes place on the circumferential surface of the blank and as the tools swing, the notches deepen until the tools have swung toward the opposite side of the machine and the tools are out of engagement with the blank when the cutting is completed. The cutting tools can embrace either one or two teeth flanks as shown in Figs. 23 and 25. The swinging or oscillating motion of the tools which constitutes the feed is effected by the gear 295 of the arm 297, engaging the gear 299 on the shaft 320 by which motion is transmitted to the shaft 328 through the coacting spiral gears 322 and 324. The worm 201 on the said shaft 328 meshes with the worm segment 200 of the tool guide ring 55 whereby the cutting tools are swung into and away from cutting engagement with the gear blank. The gears 331 and 335 connect the shaft 328 with the differential gearing in the head 48 by means of the pinion 107.

Having described my invention what I desire to secure by Letters Patent and claim is:

1. A gear cutting machine comprising a tool carrying head, a reciprocating tool mounted thereon, a gear blank support, means for adjusting said support to hold the blank so that a plane passing through the center thereof will be either parallel to the line of tool travel or inclined thereto at option, means for initially positioning the tool laterally of the blank, to begin the cutting operation, periodically actuated mechanism for indexing the gear blank, mechanism adapted to translate the tool conjointly with the tool-head in a straight line transversely of the face of the blank in consecutive operative positions constituting the loci of the teeth of a rack, mechanism adapted to translate the tool independently of the tool-head circularly across the face of the blank in consecutive operative positions constituting the loci of the teeth of a crown gear, differential mechanism connected with said indexing mechanism and connectible with either of said translating mechanisms, an operative connection between said indexing mechanism and said translating mechanism, selected in accordance with the characteristics of the gear to be cut whereby a relative ratio is maintained between all of said mechanisms, and operative means capable of setting either of said translating mechanisms in motion, thereby evolving either a spur or a bevel gear.

2. In a machine of the character described the combination of a tool carrying head, an oscillatable member at one end of said head, a pair of cutting tools pivoted centrally on the said oscillatable member and operating on an intermittently indexed bevel gear blank in the machine, means to vertically adjust the tool carrying head to locate the pivotal center of the cutting tools in operative position relatively to the apex of the gear blank, means to longitudinally adjust the said carrying head to locate the said tool in operative position relatively to the diameter and depth of the teeth of the gear blank, means to adjust the gear blank to locate the bottom of the teeth of the gear blank in line with the cutting tools, and means to rotate the oscillatable member in consecutive angular positions to enable the cutting tools to assume positions constituting the loci of the teeth of a crown gear when cutting bevel gears.

3. In a machine of the character described the combination of a tool carrying head, a pair of guides on the head, tool slides in the guides, an adjustable tool carrying member for each of the tool slides, a pair of rack-tooth-shaped cutting tools one in each adjustable member, means to vary the distance between the said adjustable members to control the thickness of the teeth of an intermittently indexed gear blank mounted in the machine, a pair of uprights engaging the opposite sides of the said tool carrying head to guide the latter vertically, means to raise and lower the said head between the said uprights to locate the cutting tools suitable to the width of the face of the gear blank, a plate for the lower ends of the uprights slidably mounted on a supporting plate, means to locate the cutting tools in consecutive positions constituting the loci of the teeth of a rack or crown gear, a pair of V guides in the machine engaging the said supporting plate, and means to translate the said supporting plate thereon to properly locate the cutting tools suitably for the diameter and the correct depth of the teeth of the gear blank.

4. In a machine of the character described the combination of a tool carrying head, an oscillatable member at one end thereof, a pair of lower guides extending radially from the axial center of the said oscillatable member and adjustably attached to one side thereof, an upper guide secured to the other side of the said oscillatable member, a sliding block for each of the said lower guides, a tool slide operated in the path of the sliding block in each of the said lower guides, a swinging arm pivoted to each of the said tool slides, a pair of tool carrying members adjustably mounted on the said arms, links connecting the said sliding blocks with the said swinging arms to swing the said cutting tools attached to the latter in and out of cutting engagement with an intermittently indexed gear blank mounted in the machine, a head slidably mounted in the said upper guide, links adjustably connecting the said sliding head with the said sliding blocks to impart motion to the latter, a shaft journaled in a bearing formed with one end of the said tool carrying head, means connected up with one end of the said shaft to transmit a rotatable movement thereto, a crank disk for the other end of the said shaft, a crank pin in the said crank disk, a rod connecting the said crank pin with the said sliding head, and means to adjust the radius arm of the said crank pin to control the movement of the said sliding head and the therewith connected elements suitable to the width of face of the said gear blank.

5. In a machine of the character described the combination of a tool carrying head with a pair of cutting tools on the head, a shaft journaled at one end of the said head and connected up with the said pair of tools, means to transmit rotation to the said tool actuating shaft to operate the said pair of tools, a pinion having its axis synchronously revolving with the said tool actuating shaft, a pair of oppositely rotatable gears mounted in axial alinement with the said tool actuating shaft, feed mechanism connected up in the machine, means to transmit predetermined rotation from said feed mechanism in the machine to one of the gears of the said pair of oppositely rotatable gears to control through the said synchronously revolving pinion the other gear of the said pair of gears, a shaft journaled at the other end of the said head, a second pinion having its axis revoluble with the said latter shaft, means to impart to the axis of the said pinion a periodical movement of motion and rest, a second pair of oppositely rotatable gears mounted in axial alinement with the said latter shaft, a gear blank indexing shaft connected up in the machine, and means to transmit predetermined rotation to one of the gears of the second pair of oppositely rotatable gears to control through the said second periodically revoluble pinion the other gear of the said second pair of gears to periodically rotate said gear blank indexing shaft at a predetermined rate of speed depending upon the number of teeth cut on a gear blank mounted on the machine.

6. A gear cutting machine comprising a tool-head, a tool mounted thereon, means to operate said tool, a gear blank support, means for adjusting said support relative to the tool-head and holding the blank either level or at an angle at option with the face of the blank in the path of said tool, indexing mechanism for periodically actuating said gear blank support connected up at one side with said tool operating means, differential mechanism operatively connected up with the other side of said indexing mechanism in accordance with the characteristics of the gear to be cut, other mechanism adapted to translate the tool conjointly with the tool-head in a straight line transversely of the blank in consecutive operative positions constituting the loci of the teeth of a rack, mechanism adapted to translate the tool independently of the tool-head circularly across the face of the blank in consecutive operative positions constituting the loci of the teeth of a crown gear, either of said translating mechanisms being adapted to be connected up with said differential mechanism, and operative means capable of setting either of said translating mechanisms in motion whereby either a spur or a bevel gear can be evolved at option.

7. A gear cutting machine comprising a tool-head, a tool mounted thereon, means to operate said tool, a gear blank support, means for adjusting said support relative to the tool-head to hold the blank either level or at an angle at option with the face of the blank in the path of said tool, mechanism for indexing the blank connected up with said tool operating means, change gearing interposed between the tool operating means and the indexing mechanism proportioned to the number of teeth of the gear to be cut, mechanism adapted to translate the tool conjointly with the tool-head in a straight line transversely of the blank in consecutive operative positions constituting the loci of the teeth of a rack, mechanism adapted to translate the tool independently of the tool-head circularly across the face of the blank in consecutive operative positions constituting the loci of the teeth of a crown gear, operative means for setting in motion either of said translating mechanisms whereby a gear of the spur or bevel gear type is evolved, change gearing interposed between the translating and the indexing mechanisms selected in accordance with the pitch of the gear to be cut and differential mechanism interconnecting all of said mechanisms whereby a relative ratio is maintained therebetween predetermined by the characteristics of the gear to be cut.

8. A gear cutting machine comprising a tool-head, a tool mounted thereon, means to operate said tool, a gear blank support, means for adjusting said support relatively to the tool-head to hold the blank either level or at an angle at option with the face of the blank in the path of said tool, mechanism for indexing the blank, change gearing interposed between the tool operating means and the indexing mechanism proportioned with relation to the number of teeth of the gear to be cut, mechanism adapted to translate the tool conjointly with the tool-head in a straight line transversely of the face of the blank in consecutive operative positions constituting the loci of the teeth of a rack, mechanism adapted to translate the tool independently of the tool-head circularly across the face of the blank in consecutive operative positions constituting the loci of the teeth of a crown gear, a nest of gears common to both of said translating mechanisms interposed therebetween and the indexing mechanism whereby the ratio of feed is predetermined, operative means for setting in motion either of said translating mechanisms whereby a gear of the spur or bevel gear type is evolved, change gearing interposed between the translating mechanisms and the indexing mechanism selected in conformity with the pitch of the gear to be cut, and differential mechanism interconnecting all of said other mechanisms whereby a closed cycle of gearing maintains a relative ratio therebetween in accordance with the characteristics of the gear to be cut.

9. A gear cutting machine comprising a tool support, a tool angularly adjustable on said support adapted while cutting to travel in paths constituting either the loci of the teeth of a rack or of a crown gear, a gear blank support adjustable relatively to the tool support to hold the blank stationary so that a plane passing through the center thereof will be either parallel or inclined to the path of the tool, means for bringing the tool to the blank at right angles thereto, and means for adjusting said supports with respect to each other to suit different sizes as well as types of blanks and so that the cutting operation can take place either straight or circularly across the face of the blank, thereby evolving either a spur or spiral or a bevel gear at option.

10. In a gear cutting machine, the combination with a tool support adjustable longitudinally and laterally in a rectilinear manner, a tool fixed in a horizontal position thereon, and means for reciprocating said tool in a vertical plane, of an adjustable gear blank support, and means for holding said latter support so that a plane passing through the center thereof will be either parallel or at an angle relatively to the path of the tool whereby the cutting of a gear tooth will take place in a substantially vertical plane, while the blank is held stationary during the cutting operation.

11. In a gear-cutting machine, the combination with a tool support adjustable longitudinally and laterally in straight horizontal planes, a fixed horizontal tool on said support adjustable in a rectilinear manner either in a vertical or lateral plane or both, and means for reciprocating said tool in a vertical plane on its support, of a support for the gear blank, means for adjusting said latter support and holding the blank so that a plane passing through the center thereof will be either parallel or at an angle relatively to the line of reciprocation of the tool, whereby the cutting of a gear tooth will take place in a substantially vertical plane, while the blank is held stationary during the time the cutting is going on, and means for positively moving the tool in a longitudinal direction toward and away from the blank between strokes.

12. In a gear cutting machine, the combination with a stationary gear blank support and means for holding the blank thereon with the face thereof to be cut substantially vertical, of a tool-head disposed above the gear blank support, a rotary shaft therein, a ring movable concentrically around said shaft, a guide carried by the ring permanently set relatively to the sides and depth of the teeth to be cut, a tool, reciprocated in said guide by the rotary shaft, means for adjusting the guide angularly with relation to the ring whereby the tool will be caused to move obliquely across the face of the blank from one side to the other to successively complete the teeth, and means for imparting a unitary motion to the blank.

13. In a gear cutting machine, the combination with a stationary gear blank support and means for holding the blank thereon with the face thereof to be cut substantially vertical, of a tool-head, a support therefor, means for sliding said head in a straight line a sufficient distance relatively to the diameter and depth of teeth to be cut on the gear blank, a rotary shaft, a tool on the head reciprocated by said shaft, a guide directing said tool in a substantially vertical direction across the face of the blank, means for imparting a unitary movement to the gear blank support, means for swinging the tool-guide to direct the tool obliquely across the face of the blank, and means for sliding the tool-head transversely on its support.

14. A gear cutting machine comprising a tool, a support therefor, a gear blank support, means for locating the tool properly to cut across the face of the blank, a suitable device for reciprocating the tool, mechanism for indexing the blank, mechanism for translating the tool and causing it to assume consecutive operative positions constituting the loci of certain gear teeth meshing into the blank, change gears selected in accordance with both the number of teeth and the pitch of the gear to be cut and differential gears operatively connected with said change gears, all of said gears being arranged in a closed cycle whereby a relative ratio between the several mechanisms is maintained.

15. A gear cutting machine comprising a tool, a support therefor, a gear blank support, means for moving the tool in a straight line and locating it properly with relation to the face of the blank, a suitable device for reciprocating the tool, mechanism for imparting a unitary motion to the blank, mechanism for translating the tool transversely of the blank and causing it to pass through consecutive positions constituting the loci of certain gear teeth, trains of gears connected up in a closed cycle conjointly operating said mechanisms including differential gearing and change gears selected in accordance with the characteristics of the gear to be cut and means intermittently arresting and releasing said train of gears whereby the tool is enabled to cut and the blank is indexed.

16. In a gear cutting machine, the combination with a stationary gear-blank support, a tool head movable toward the same so as to bring the tool over the blank in a straight line a sufficient distance relatively to the diameter and depth of teeth to be cut thereon, and means for imparting a unitary motion to the blank in one plane, of a rotary shaft journaled in said head, a tool permanently guided in a vertical plane relative to the sides of the teeth to be cut and reciprocated by said shaft, and means for varying the length of stroke of said tool to suit the face of the blank.

17. In a gear cutting machine, the combination with a gear blank support and a tool-head rectilinearly adjustable one toward the other in a straight horizontal plane, of a guide carried by said head and adjustable therewith for directing the tool in a permanent path relatively to the sides of the teeth throughout the cutting operation, a rotary shaft in the tool head, a cross-head movable with said guide and reciprocated therein by said shaft, one or more tools connected with said cross-head and moved thereby substantially vertically across the face of the blank and means for imparting a unitary motion to the blank.

18. In a gear cutting machine, the combination with a gear-blank support, a tool-head movable toward the same to locate the tool relatively to the diameter and depth of teeth to be cut on the blank, and means for imparting a unitary motion to the blank in one plane, of a diametrically grooved disk rotatably mounted on said head, a block in the groove of said disk, a screw acting parallel with the groove providing for radial adjustment of said block therein, and a vertically reciprocated tool set permanently parallel with the sides of the teeth to be cut in the blank, said tool having connections moved by the adjusted block.

19. In a gear cutting machine, the combination with a gear-blank support and a tool-head movable toward the same to locate the tool over the blank, of a ring revoluble on said head so as to lie thereon at a desired angle, a guide secured to said ring, a cross-head in said guide, a rotary shaft, one or more vertically reciprocating tools connected with said cross-head and directed by the guides in permanent paths relative to the sides of the teeth to be cut, another connection between the cross head and the rotary shaft and means for imparting a unitary motion to the blank.

20. In a gear cutting machine, the combination with a tool-head and a gear blank support movable one toward the other in a straight line, of a slide carried by said head in a vertical plane, a cross-head in said slide, a revoluble disk, a plurality of tools, guides therefor directing the tools in permanent paths relatively to the sides of the teeth to be cut, rods pivotally connecting said tools with said cross-head, an adjustable reciprocating connection between the cross head and said disk, and means for imparting a unitary motion to the blank.

21. In a gear cutting machine, the combination with a reciprocable tool, a tool-support longitudinally slidable on the base of the machine to adjust the tool to the diameter of the blank, and the depth of the teeth to be cut thereon, and a support adapted to hold the blank with its face thereof in a substantially vertical plane below the tool, of a rotary disk, a slide at the end of said tool support, a cross-head in said slide, a guide on the latter support below the slide, said tool being operable in said guide, working connections between said disk and said cross-head and also between the latter and the tool, and means for laterally adjusting the tool support to locate the tool in accordance with the diameter of the blank to be operated upon, said means being also capable of translating the tool in consecutive operative positions constituting the loci of the teeth of a rack.

22. In a gear cutting machine capable of cutting spur, spiral and bevel gears, the combination with a gear blank support and a tool support movable toward the same in a straight line to locate the tool over the blank, of a vertically-disposed oscillatable slide carried by said tool support, a cross-head in said slide, a pair of vertically reciprocating tools connected with said cross-head, guides for said tools respectively adjustable in accordance with the type of gear to be cut, said guides directing the tools in permanent paths relatively to the sides of the teeth, pivotal connections between the tools and said cross-head and means for adjusting said guides with respect to each other whereby the tools are enabled to work either in parallelism or on divergent lines, as required.

23. In a gear-cutting machine, the combination of a vertically-reciprocable tool, a support therefor, a gear-blank support, said supports being movable one toward the other in a straight line to locate the tool over the face of the blank, an oscillatable member carried in a vertical plane on the end of said tool support, an adjustable guide on said member, a tool slide in said guide, a tool carrying arm pivoted at its upper end independently of said slide, and a connection between said arm and said slide whereby the tool is swung in and out of engagement with the blank.

24. In a gear cutting machine, the combination with a longitudinally and laterally adjustable support, an oscillatable member on said support, a horizontally disposed tool on said member, adjustable either in a vertical or lateral plane, or both, and means for vertically reciprocating said tool, of a support for the gear blank, means for holding the blank on said latter support with its face lying under the tool in a substantially vertical plane, and means for angularly adjusting the oscillatable member on the first mentioned support thereby enabling the tool to cut either a spur or a spiral gear at option.

25. In a gear cutting machine, the combination with a laterally rectilinearly translatable support and an angularly adjustable tool thereon adapted for reciprocation in a fixed inclined plane, of a support for the gear blank and means for maintaining the face of the blank in a permanent vertical position in the path of the tool while cutting, whereby a spiral gear will be generated when the tool support is translated.

26. In a gear cutting machine, the combination with a tool and a support therefor longitudinally and laterally translatable on the base of the machine in straight horizontal planes, said tool being angularly adjustable on the support and thereby adapted for reciprocation in an inclined plane, of a support for the gear blank and means for holding the blank fixed in a horizontal position on said latter support while the cutting goes on with the face thereof in the path of the tool whereby a spiral gear will be generated when the tool support is translated in a straight line laterally on the base.

27. In a gear cutting machine, the combination with a gear-blank support and a tool-head movable one toward the other, of a tool reciprocable on said head, a revoluble ring disposed at one end of the tool head provided with arcuate slots having a common center with said ring and equidistant therefrom, a pair of normally parallel tool guides adjustably secured at their inner ends by bolts engaging said slots whereby said guides are permanently set relatively to the sides of the teeth to be cut, swivel sockets carried by said guides, and centrally jointed screws in threaded engagement with said sockets operating to separate the guides at their outer ends, to accommodate the divergence of the teeth.

28. In a gear cutting machine, the combination with a gear blank support having a unitary, intermittent motion, and a tool-head movable toward the same, of a rotary shaft in said head, a ring revoluble around said shaft concentrically therewith, a reciprocable tool carried by said ring and means for permanently setting said tool on the ring in proper relation to the sides of the teeth to be cut, whereby the tool is adapted to reciprocate at various angles relatively to the operating shaft.

29. In a gear cutting machine, the combination with a tool-support and a tool adapted for reciprocation thereon in a substantially vertical fixed plane, of a gear-blank support adjustable relatively to the tool-support, means for gradually feeding the tool in one direction in an arc intersecting the pitch-circle of the blank from one side to the other to complete the teeth thereon, and means for fixedly presenting the blank to the tool while cutting with its face substantially vertical and projecting centrally into said arc.

30. In a gear cutting machine, the combination with a gear-blank support and means for fixedly holding the face of the blank in a substantially vertical plane thereon during the cutting operation, of a tool-head, a tool reciprocable in a single vertical plane disposed outwardly on said head above the blank and means for advancing said head in a straight line to locate the tool over the face of the blank according to the diameter and depth of teeth to be cut thereon.

31. In a gear-cutting machine, the combination of a tool support, a tool reciprocated thereon, a gear blank support including a sub-table adapted to hold the blank in a suitable position relatively to the reciprocating tool, a spindle socketed in said sub-table, means for rotating the sub-table at any required angle with the blank thereon in proper position for cutting the type of gear selected, and means for swinging the sub-table and blank toward or away from the plane of the tool.

32. In a gear-cutting machine, the combination of a suitable support, a tool operatively mounted thereon, a rotary shaft located under said tool, an annular shell having a lateral projection pivotally connected with said shaft, a sub-table journaled in said shell and having a socket centrally formed therein, a gear blank spindle secured in said socket, worm gears connecting said subtable with said shaft and operating to turn the former with the spindle and gear blank thereon from within said shell, a main table under the shell, and means for swinging said main table and the superimposed elements into an angular plane relative to that of the tool.

33. In a gear-cutting machine, the combination with a tool support and a tool operatively mounted thereon, of an adjustable gear-blank support including a spindle centrally engaging the gear blank, a subtable thereunder, a main table, worm gearing wherewith said main table can be inclined relatively to the working plane of the tool, a rotary shaft located at the bend of the main table toward the tool, a shell on the main table wherein said subtable is journaled, and gears transmitting motion from said shaft to the subtable and operating to turn the latter with the spindle and blank thereon irrespective of the position of the main table whether level or inclined.

34. In a gear-cutting machine, the combination of a suitable base, a tool support thereon, one or more tools operatively mounted on said support, a rotary shaft located transversely of said base, a gear blank support comprising an annular shell flexibly connected with said shaft, a subtable journaled in said shell, a mandrel adapted to hold the gear blank socketed in said subtable, a worm-wheel having an inwardly projecting flange secured to a corresponding flange of the subtable, a worm on said shaft engaging said worm-wheel, a main table under the annular shell, a toothed segment secured to the under side of said main table, a worm engaging said segment, a shaft forming part of the latter named worm, gearing secured to the latter named shaft, and an actuating shaft, which may be operated manually, commanding said gearing whereby the main table and elements thereabove that influence the action of the gear blank can be swung into a predetermined angular position relative to the plane of the cutting tool or tools.

35. In a gear-cutting machine, the combination of a suitable base, a supporting plate slidable longitudinally thereon, an upper plate slidable transversely of said supporting plate, uprights mounted on said upper plate, a vertically adjustable tool-head suspended from and between said uprights, a gear blank support, mechanism for moving said plates lengthwise and crosswise of the base respectively, with the adjusted tool-head thereabove and its tool in proper relation to the gear blank, and tool-operating gears actuated by said mechanism and housed in said tool-head, partaking of the latter's vertical, longitudinal, and transverse movements.

36. In a gear-cutting machine, the combination with a tool-head, a tool carried thereby and a gear blank support, of a mechanism for reciprocating the tool, a mechanism for indexing the gear blank intermittently operated by said reciprocating mechanism, a feed mechanism for moving the tool-head with its tool transversely of the gear blank, and differential mechanism operatively connecting the feed and index mechanism in a closed cycle.

37. In a gear-cutting machine, the combination with a gear-blank support, a tool head and a shiftable tool mounted thereon, of a mechanism for continuously reciprocating the tool, a spacing mechanism intermittently actuated by said reciprocating mechanism and operating to index the gear blank, and a feed mechanism working in a closed cycle with said spacing mechanism to translate the tool independently of the tool-head across the face of the gear blank, the closed cycle including differential mechanism whereby a relative ratio is maintained between the feed and indexing mechanisms.

38. In a gear-cutting machine, the combination with a tool-head and a gear blank support positioned in proper relation one to the other, of a tool angularly adjustable on said head, a reciprocating mechanism for said tool, an intermittently operated indexing mechanism for the gear blank actuated by said reciprocating mechanism, and a transversely translating mechanism for the tool-head with the tool in an adjusted position thereon, said translating mechanism being operatively connected up with the differential mechanism included in a closed cycle in the connections between the indexing and the translating mechanisms.

39. In a gear-cutting machine, the combination with a gear-blank support and a tool-head movable one toward the other, of a tool oscillatable on said head transversely of the gear blank, a mechanism for reciprocating said tool, a mechanism for rotatively spacing the gear blank intermittently operated by said reciprocating mechanism, and a translating mechanism for the tool functionally connected with said spacing mechanism, the connections including differential mechanism in a closed cycle.

40. In a gear-cutting machine, the combination with a tool-head and a gear-blank support movable one toward the other, of a tool angularly movable on said head, a mechanism for reciprocating said tool, a mechanism for indexing the gear blank intermittently operated by said reciprocating mechanism, a mechanism for translating both the tool-head and tool together transversely of the gear-blank looped with said indexing mechanism, a similarly looped mechanism likewise adapted to translate the tool alone independently of the tool-head, and a tumbling-gear for linking either of said translating mechanisms functionally with the indexing mechanism.

41. In a gear cutting machine, the combination with a tool support adjustable rectilinearly in a horizontal plane to the diameter and depth of the teeth to be cut and a tool permanently set relatively to the sides of the teeth reciprocable on said support while the latter is held stationary, of a support imparting a unitary motion to the blank adjustable relatively to the tool support and means for gradually moving the tool in an arc, cutting completely across the pitch cone of the gear to be cut to finish the teeth.

42. In a machine capable of cutting bevel gears, the combination of a reciprocable tool, a support therefor, a gear blank support, both of said supports being held stationary during the cutting operation, means for permanently setting the tool on its said support so that it will move in a fixed path thereon for the complete cutting of the teeth on the blank, means for adjusting said supports with respect to each other rectilinearly in a horizontal plane, means for imparting to the blank a unitary motion throughout the cutting operation, and means for gradually feeding the tool in a single arc cutting entirely across the blank in a plane tangent to the pitch cone thereof.

43. In a machine capable of cutting bevel gears, the combination with a reciprocable tool and its support, of a gear-blank support, means for adjusting said supports interrelatively, means for gradually moving the tool in a single arc intersecting the pitch-cone of the blank, and means for imparting a unitary motion to the blank throughout the cutting operation.

44. In a gear-cutting machine, the combination of a suitable base, a tool-head longitudinally and transversely translatable thereon, a tool on said head, a gear blank support located in a proper position relatively to said tool, mechanism for indexing the blank, mechanism for reciprocating the tool, means for feeding the tool transversely of the blank either with or independently of the tool-head, and operative connections including differential mechanism arranged in a closed cycle between the indexing mechanism and the feeding means, all of said mechanisms being grouped with the tool-head.

45. In a gear cutting machine, the combination of a reciprocable tool, a support therefor translatable longitudinally and transversely of the machine, mechanism for reciprocating said tool, a gear-blank support, means for indexing the blank, means for feeding the tool transversely of the blank either with or independently of the tool support, and operative connections arranged in a closed cycle, including differential mechanism, between the indexing and the feeding means, the tool-support carrying both said mechanisms.

46. In a gear cutting machine, the combination of a tool-head longitudinally and transversely slidable on the base of the machine, a tool carried thereby, a device for operating said tool, a gear-blank support mechanism for indexing the blank, a device for feeding the tool transversely of the blank either with or independently of the tool-head, and a closed cycle of operative connections, including differential mechanism, interposed between the indexing mechanism and the feeding device, the two said mechanisms being grouped with and carried by the tool-head.

47. In a gear cutting machine, the combination of a tool-support, a tool on said support, means to actuate said tool, primary differential mechanism connected up with said tool actuating means, an intermittent device, secondary differential mechanism connected up with said intermittent device, a gear-blank support, means connecting up one side of said gear blank support with both differential mechanisms, and means returning the motion from the secondary differential mechanism to the other side of said gear blank support.

48. In a gear cutting machine, the combination of a gear-blank support, a tool and its support, means to actuate said tool, an intermittent device operated synchronously with said tool actuating means, differential mechanism connected up at one side with said intermittent device, and means connecting up the other side of said differential mechanism with one side of the gear blank support and returning the motion in a closed cycle to the other side thereof.

49. In a gear cutting machine, the combination of a gear blank support, a tool support, a tool thereon, a shaft journaled with said tool support transmitting motion to the tool, a device adapted to impart periodical indexing movement to said gear blank support, a pair of oppositely rotating gears, one of the pair being connected up with and receiving predetermined motion from the gear blank support, another pair of oppositely rotating gears connected up both with said device and with the other one of said first pair of gears, and means transmitting the motion thus received back to the gear blank support.

50. In a gear cutting machine, the combination of a gear blank support, feed mechanism therefor, a tool and its support, a shaft journaled in said tool support and connected up with said tool, means to transmit motion to said shaft to operate the tool, a device adapted to impart periodically timed indexing movement to said feed mechanism receiving motion synchronous with the tool operating shaft, a pair of gears, one gear of said pair being connected up with the feed mechanism, means for imparting rotation to the other one of said pair of gears dependent upon the motion of the first mentioned gear, another pair of gears, one of said latter pair of gears being connected up with the other one of said first pair of gears, means for imparting rotation to the other one of said second pair of gears dependent upon the motion from the aforesaid device, and other means receiving the compound motion from said latter means and the first mentioned one of said second pair of gears and returning it to the gear blank feed mechanism.

51. A gear cutting machine comprising a base, a gear-blank support at one end thereof, a supporting plate longitudinally movable on said base, a second plate slidable upon said supporting plate transversely of the base, a tool carrying support on said second plate, a driving shaft journaled in the base, a shaft rotatably carried by the supporting plate and driven by said driving shaft, a shaft carried by the slidable plate receiving its motion from said second shaft and connected up with said tool support, mechanism driven by said last named shaft and converting the motion therefrom into intermittent rotation, a second shaft carried by said sliding plate and driven intermittently by said mechanism, a second shaft carried by said supporting plate receiving its motion from the latter shaft, a second shaft journaled in the base driven by said second shaft of the supporting plate, and a third shaft supported from the base receiving its motion from said last named shaft and transmitting intermittent motion to said gear-blank support.

52. A gear cutting machine comprising a base, a support and tool longitudinally and transversely translatable on said base, a drive, mechanism capable of dividing continuous motion into reciprocatory tool operating motion and intermittent spacing motion, shafting connecting said drive with said mechanism, a gear blank support, and a second line of shafting connected up with the latter transmitting thereto said intermittent motion, both said lines of shafting permitting vertical, longitudinal, and transverse movements of the tool support relatively to the base.

53. A gear cutting machine comprising a base, a drive shaft, a gear slidable on said shaft, a supporting plate movable lengthwise on the base, a shaft carried by said supporting plate and driven from said gear, a sliding plate mounted on the supporting plate and translatable crosswise of the base, a gear slidable on the latter named shaft, a vertically slidable shaft carried by said sliding plate and driven from the latter named gear, a device adapted to convert continuous motion transmitted from said vertically slidable shaft into intermittent spacing motion and reciprocatory tool operating motion, a second vertically slidable shaft operatively connected up with said device, a second shaft carried by the supporting plate, a gear slidable on said second shaft of the supporting plate driven from said vertically slidable shaft, an intermediate shaft, a gear slidable on said intermediate shaft and driven from said second shaft of the supporting plate, a gear blank support, a shaft transmitting motion to said gear-blank support, and gearing connecting up the intermediate shaft with said last named shaft.

54. A gear cutting machine comprising a base, a drive shaft mounted horizontally thereon, a supporting plate translatable along said base, a transverse shaft carried horizontally by said plate, a pair of coöperating gears connecting said transverse shaft with said drive shaft and slidable relatively to the latter, a sliding plate mounted on said supporting plate and translatable across the base, a pair of coöperating gears driven by said transverse shaft and slidable relatively thereto, a vertically disposed shaft slidable through one of the latter named gears, means for transforming continuous motion received from said shafts and gears into reciprocatory tool operating motion and intermittent spacing motion, a second transverse shaft carried horizontally by said supporting plate, a pair of coöperating gears driven by and slidable relatively to said second transverse shaft, a second vertical shaft connected up with said transforming means and transmitting motion therefrom to the last named gears, having slidable engagement with one of the latter, and intermediate shaft mounted horizontally on the base, a pair of coöperating gears transmitting motion from said second transverse shaft to said intermediate shaft, one of the latter gears being slidable on the latter shaft, a third horizontal shaft mounted longitudinally of the base, change gearing connecting the intermediate shaft with said third shaft, and a gear-blank support driven by said last named shaft.

55. A gear cutting machine comprising a base, a driving shaft, a tool carrying support translatable on said base, a pair of gears carried by said support operatively connected with said driving shaft, one of said gears being carried by a sleeve journaled in the tool carrying support, a shaft slidable in said sleeve and driven thereby, mechanism capable of changing continuous rotation from said shafts to tool operating and spacing motions, a third shaft receiving motion from said mechanism, said third shaft being slidable in a sleeve also journaled in the tool carrying support, a second pair of gears carried by the tool support, one of said second pair of gears being mounted on and driven by the latter named sleeve, and a gear blank support operatively connected up and deriving its motion from the other one of said second pair of gears, said shafts and gears being capable of transmitting motion while the tool carrying support is translated either longitudinally or transversely.

56. A gear cutting machine comprising a base, a driving shaft, a tool carrying support longitudinally and transversely translatable on said base, mechanism converting rotary motion from said shaft into reciprocating and intermittent motions, a second shaft, gearing and shafting operatively connecting up said mechanism with the drive shaft, other shafting and gearing actuated by said mechanism and transmitting indexing motion therefrom to said second shaft, a gear blank support operated by the latter named shaft, means for imparting feed motion to the tool carried by said first named support, a nest of gears included in said means for predetermining the rate of feed of the tool, and a device operatively connecting up said feeding means with said nest of gears.

57. A gear-cutting machine comprising a tool support and gear blank support longitudinally and transversely adjustable one with relation to the other, a drive, mechanism capable of converting motion received from said drive into tool operating and indexing motions, an operative connection transmitting indexing motion from said mechanism to said blank support, a shaft for feeding the tool transversely across the face of the blank, another shaft for feeding the tool circularly across the blank's face, and a nest of gears coupling said connection with either of said shafts to pre-determine the rate of feed transmitted thereto.

58. A gear cutting machine comprising a support and a tool oscillatably mounted thereon, a drive, mechanism capable of converting motion received from said drive into tool operating and indexing motions, an operative connection between said mechanism and said drive, a gear-blank support, another connection transmitting indexing motion from the mechanism to said gear-blank support, a main feed shaft, a feed controlling device interposed between said other connection and said main feed shaft, a branch shaft for feeding the tool transversely of the face of the blank, another branch shaft for feeding the tool in an oscillatory manner across the blank's face, and means for driving either of said branch shafts from the main feed shaft.

59. A gear-cutting machine comprising a tool-support, a tool oscillatably mounted on the latter, a drive, means for changing motion received from said drive into tool operating and indexing motions, a gear-blank support, an operative connection between said means and said blank-support, a main feed shaft, a device for predetermining the rate of feed transmitted from said operative connection to said main feed shaft, a branch shaft for feeding the tool transversely of the blank, another branch shaft for imparting oscillatory feed motion to the tool, and a device capable of receiving and reducing the speed of motion from said main feed shaft and transmitting it to either of said branch shafts.

60. A gear-cutting machine comprising a tool support and tool oscillatably carried thereby, a drive, means for converting motion received from said drive into tool operating and indexing motions, a gear-blank support, an operative connection between said means and said blank support, a main feed shaft, a speed changing device between said connection and said main feed shaft, a branch shaft for feeding the tool transversely of the blank, another branch shaft for imparting oscillatory feed motion to the tool across the blank, mechanism for coupling either of said branch shafts with said main feed shaft, and a speed reducer connecting the latter with said mechanism.

Signed at Rochester in the county of Monroe and State of New York this 2nd day of September A. D. 1909.

JOHAN ALFRED SVENSSON.

Witnesses:
W. K. SMITH,
B. HARKNESS.